United States Patent
Xu et al.

(10) Patent No.: US 9,565,719 B2
(45) Date of Patent: Feb. 7, 2017

(54) ELECTRONIC DEVICE FOR MULTIPLE RADIO ACCESS AND METHOD THEREOF

(71) Applicant: Samsung Electronics Co., Ltd., Suwon-si, Gyeonggi-do (KR)

(72) Inventors: Jiangwei Xu, Suwon-si (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/261,006

(22) Filed: Apr. 24, 2014

(65) Prior Publication Data

US 2014/0323178 A1    Oct. 30, 2014

(30) Foreign Application Priority Data

Apr. 25, 2013 (KR) .................. 10-2013-0046124
Feb. 20, 2014 (KR) .................. 10-2014-0019934

(51) Int. Cl.
| | |
|---|---|
| H04B 7/00 | (2006.01) |
| H04W 88/06 | (2009.01) |
| H04W 76/02 | (2009.01) |
| H04M 1/725 | (2006.01) |

(52) U.S. Cl.
CPC ........... *H04W 88/06* (2013.01); *H04W 76/026* (2013.01); *H04M 1/72519* (2013.01); *H04M 2250/06* (2013.01)

(58) Field of Classification Search
CPC ...... H04L 43/04; H04L 43/0876; H04L 67/06; H04L 12/189; H04L 47/125
USPC ................................. 455/520, 3.01
See application file for complete search history.

(56) References Cited

U.S. PATENT DOCUMENTS

| | | | |
|---|---|---|---|
| 7,555,559 | B2 | 6/2009 | Chapweske |
| 8,516,147 | B2 | 8/2013 | Kaspar et al. |
| 2009/0067441 | A1 | 3/2009 | Ansari et al. |
| 2010/0008363 | A1 | 1/2010 | Ee et al. |
| 2010/0226298 | A1 | 9/2010 | Chan et al. |
| 2011/0222404 | A1 | 9/2011 | Watson et al. |
| 2011/0252275 | A1* | 10/2011 | Gudlavenkatasiva et al. . 714/15 |
| 2013/0132469 | A1* | 5/2013 | Levicki et al. ............... 709/203 |
| 2014/0293829 | A1* | 10/2014 | Visuri et al. .................. 370/254 |

FOREIGN PATENT DOCUMENTS

| | | |
|---|---|---|
| WO | 2010-058908 A2 | 5/2010 |
| WO | 2013/055649 A1 | 4/2013 |

OTHER PUBLICATIONS

Anjali Sridhar et al., "Sangam-efficient cellular-WiFi CDN-P2P group framework for file sharing service".
(Continued)

*Primary Examiner* — Tu X Nguyen
(74) *Attorney, Agent, or Firm* — Jefferson IP Law, LLP

(57) ABSTRACT

An electronic device and a method for simultaneously receiving a multimedia service over multiple radio access networks are provided. The electronic device includes a plurality of network interfaces for accessing a multimedia service provider, and a multi-interface handler for controlling to receive a multimedia service content divided, from the service provider via the network interfaces respectively, if part of the content is completely received via one of the network interfaces, to receive the remaining content re-divided via the network interfaces.

32 Claims, 42 Drawing Sheets

(56) References Cited

OTHER PUBLICATIONS

Kuschnig et al., Improving Internet Video Streaming Performance by Parallel TCP-based Request-Response Streams, Consumer Communications and Networking Conference (CCNC), 2010 7th IEEE, IEEE, Jan. 9, 2010, pp. 1-5, XP031642982, ISBN: 978-1-4244-5175-3, section IV. Request-response-based client-driven streaming, Piscataway, NJ, USA.

* cited by examiner

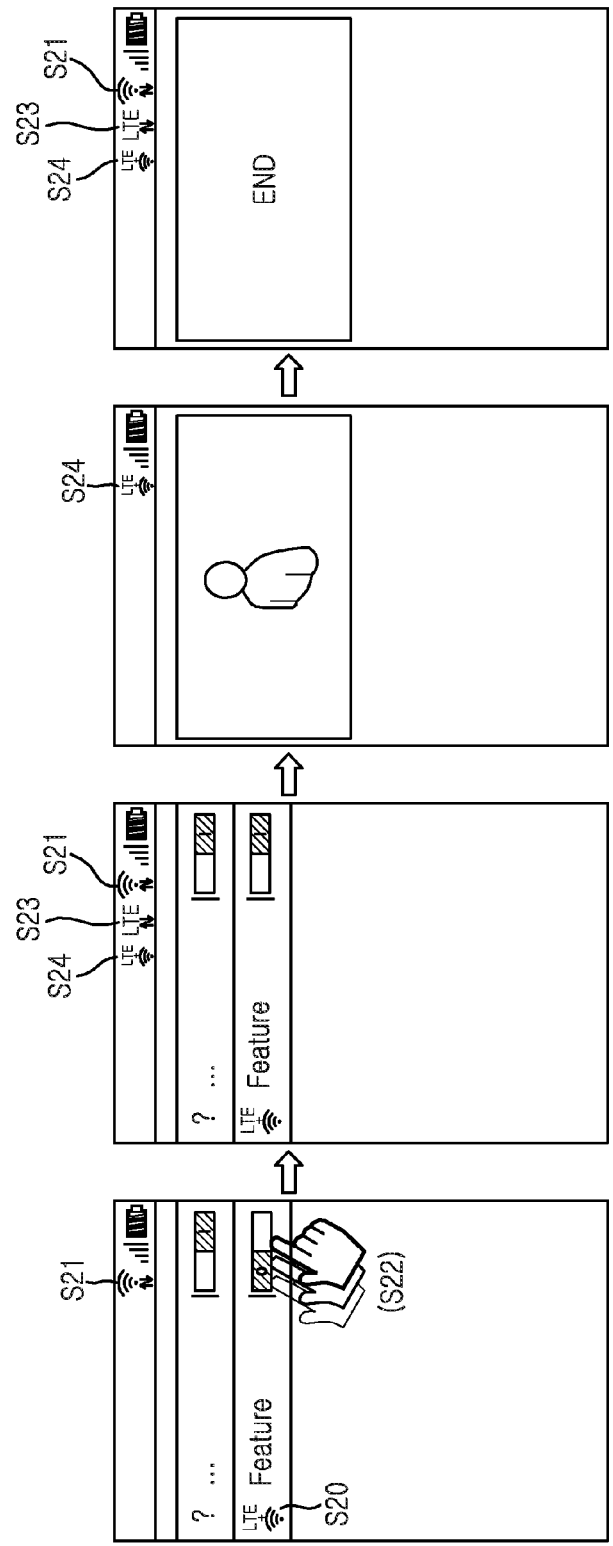

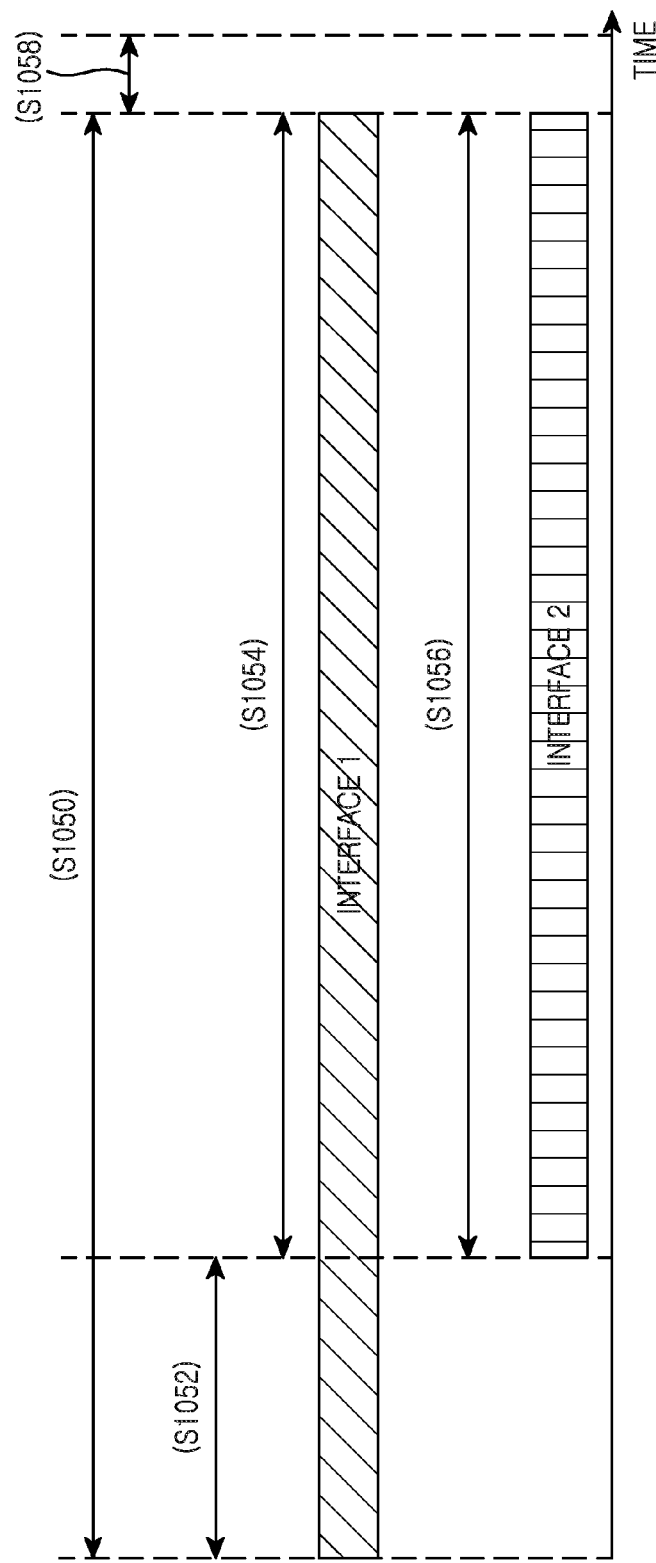

|  | Time Period 1 | Time Period 2 | Time Period 3 | ..... | Time Period T |
|---|---|---|---|---|---|
| [0~S1) | $R_1(1)$ | $R_1(2)$ | $R_1(3)$ |  | $R_1(T)$ |
| [S1~S2) | $R_2(1)$ | $R_2(2)$ | $R_2(3)$ |  | $R_2(T)$ |
| [S2~S3) | $R_3(1)$ | $R_3(2)$ | $R_3(3)$ |  | $R_3(T)$ |
| ...... |  |  |  |  |  |
| [Sn~∞) |  |  |  |  |  |

FIG.28

ELECTRONIC DEVICE FOR MULTIPLE RADIO ACCESS AND METHOD THEREOF

CROSS-REFERENCE TO RELATED APPLICATION(S)

This application claims the benefit under 35 U.S.C. §119 (a) of a Korean patent application filed on Apr. 25, 2013 in the Korean Intellectual Property Office and assigned Serial numbers 10-2013-0046124 and a Korean patent application filed on Feb. 20, 2014 in the Korean Intellectual Property and assigned Serial number 10-2014-0019934, the entire disclosures of each of which is hereby incorporated by reference.

TECHNICAL FIELD

The present disclosure relates to an electronic device having a radio access function.

BACKGROUND

Recent electronic devices provide various multimedia services to users. For example, the users can access an Internet Protocol (IP)-based network through the electronic device and then receive from a service provider not only a text and an image but also various multimedia services such as a video call service, a multimedia messaging service, a content service, a broadcasting service, a game service, and a chatting service.

The electronic devices implement mobility to allow the users to use the multimedia service at any place. The mobile electronic device is a so-called mobile device. For example, the electronic devices such as a smart phone, a Personal Data Assistant (PDA), a notebook, and a digital camera is capable of wirelessly accessing the IP-based network.

The user can receive the multimedia service over any one network connected. For example, the electronic devices can receive the multimedia service by accessing a 3$^{rd}$ Generation (3G) network or a Long Term Evolution (LTE) network. For example, the electronic devices can receive the multimedia service by accessing a wireless Local Area Network (LAN) such as Wireless Fidelity (Wi-Fi). For example, the electronic devices can receive the multimedia service by accessing a wireless network such as Worldwide Interoperability for Microwave Access (WiMAX). As such, the electronic devices can receive the multimedia service over only one radio access network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for receiving a multimedia service over multiple radio access networks at the same time.

Another aspect of the present disclosure is to provide an apparatus and a method for rapidly receiving multimedia service data via a plurality of data interfaces.

Another aspect of the present disclosure is to provide an apparatus and a method for stably receiving multimedia service data via a plurality of data interfaces.

Another aspect of the present disclosure is to provide an apparatus and a method for adaptively receiving multimedia service data via a plurality of data interfaces or a single data interface.

In accordance with an aspect of the present disclosure, an electronic device is provided. The electronic device includes a plurality of network interfaces for accessing a multimedia service provider, and a multi-interface handler for controlling to receive a multimedia service content divided, from the service provider via the network interfaces respectively, if part of the content is completely received via one of the network interfaces, to receive the remaining content re-divided via the network interfaces.

In accordance with another aspect of the present disclosure, a method for operating an electronic device is provided. The method includes controlling to receive a multimedia service content divided, from a multimedia service provider via a plurality of network interfaces, and if part of the content is completely received via one of the network interfaces, controlling to receive the remaining content re-divided, via the network interfaces.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C, and 5D illustrate screens displayed on an electronic device if a multiple radio access is activated according to an embodiment of the present disclosure;

FIG. 16B illustrates contents downloaded according to a multi-radio access according to another embodiment of the present disclosure;

FIG. 28 illustrates an application request size DataBase (DB) for a multi-radio access according to an embodiment of the present disclosure;

Throughout the drawings, like reference numerals will be understood to refer to like parts, components and structures.

DETAILED DESCRIPTION

Figure 1:
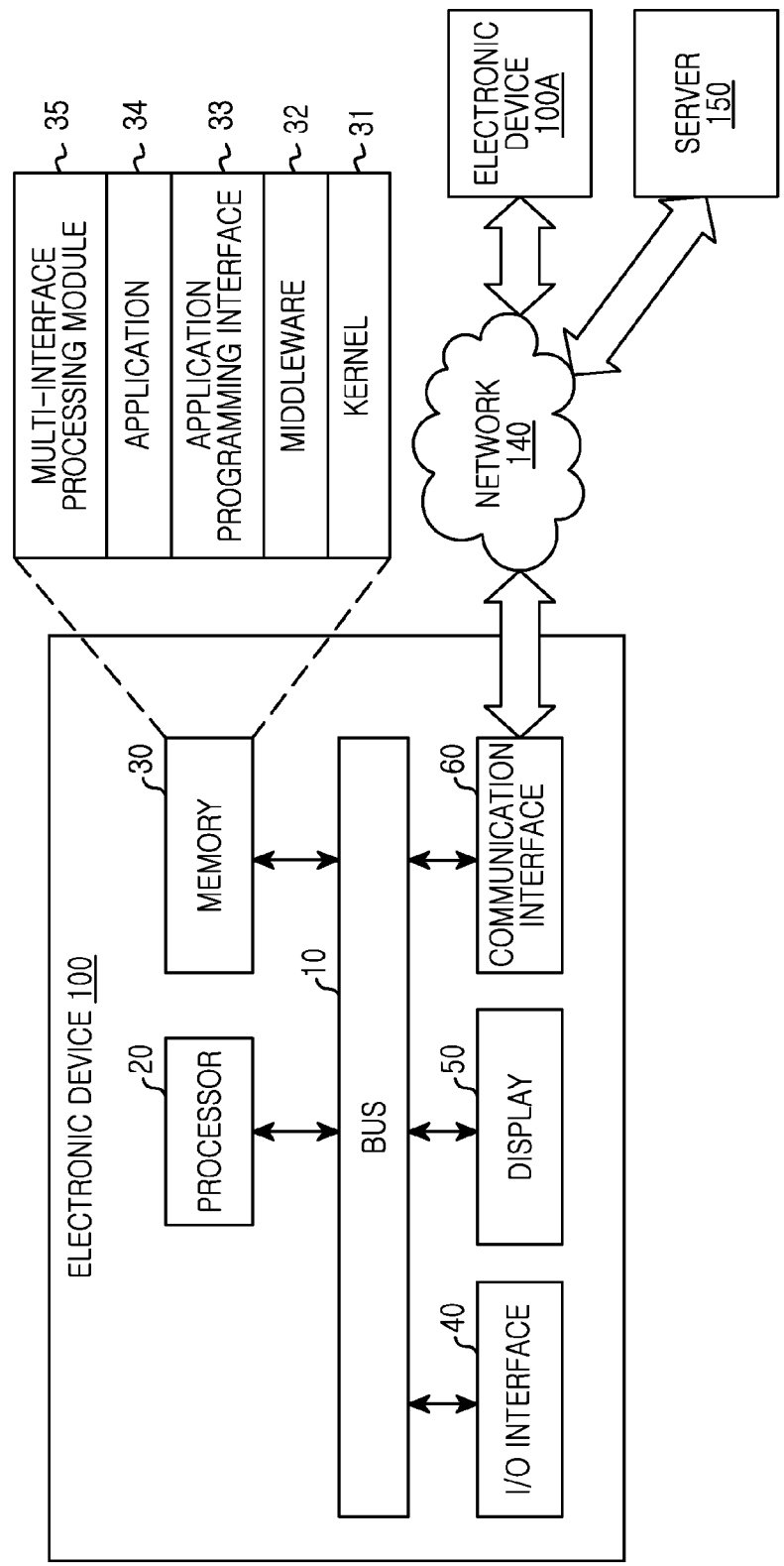
FIG. 1 illustrates a network including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure can employ a device having a communication function. The electronic device can include at least one of, for example, a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical appliance, a camera, and a wearable device (e.g., a Head-Mounted-Device (HMD) such as electronic glasses, e-textiles, an electronic bracelet, an electronic necklace, an electronic accessory, an electronic tattoo, and a smartwatch).

The electronic device can employ a smart home appliance having the communication function. The smart home appliance can include at least one of, for example, a television, a Digital Versatile Disc (DVD) player, an audio system, a refrigerator, an air conditioner, a vacuum, an oven, a microwave oven, a washing machine, an air purifier, a set-top box, a TeleVision (TV) box (e.g., Samsung HomeSync™, AppleTV™, Google TV™), a game console, an electronic dictionary, an electronic key, and a digital frame.

The electronic device can employ at least one of medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), an in-vehicle infotainment, marine electronic equipment (e.g., marine navigation device and gyro compass), avionics, a security device, a vehicle head unit, an industrial or home robot, an Automatic Teller's Machine (ATM) of a financial company, and a Point Of Sale (POS) of a store.

The electronic device can employ at least one of furniture or part of building/structure having the communication function, an electronic board, an electronic signature receiving device, a projector, and gauges for water, electricity, and radio wave. Those skilled in the art shall understand that the electronic device of the present disclosure is not limited those devices.

Hereinafter, various embodiments of the present disclosure allows a multimedia service provided over multiple radio access networks at the same time, rather than the multimedia service provided over only one radio access network, in the electronic device such as mobile device. While running an application for the multimedia service, the electronic device allows for the rapid receiving of data (or content) requested by the application via a plurality of data interfaces. Alternatively, while running the application for the multimedia service, the electronic device can stably receive the data requested by the application. Alternatively, while running the multimedia service application, the electronic device can adaptively receive the data requested by the application via the multiple data interfaces or the single data interface.

The multimedia service indicates a service offered by a service provider if the user runs a particular application (app) in the electronic device. The multimedia service data indicates data offered by the service provider. The multimedia service data may be referred to as contents or a content. The multimedia service can include various services, for example, but not limited to, a text and image service, a video call service, a multimedia messaging service, a content service, a broadcasting service, a game service, and a chatting service. If the user runs the multimedia service application in the electronic device, the multimedia service can be provided by the service provider connected to an Internet Protocol (IP)-based network such as the Internet. While the present disclosure can be applied to various electronic devices, it is applied to the mobile device such as a smartphone by way of example. The term "user" can represent a person or a device (e.g., artificial intelligent electronic device) who or which uses the electronic device.

As a cellar network and the smartphone advance, more contents are serviced to the smart-phone. In particular, a high-quality video content can include hundreds of Mega-Bytes (MB) and may require tens of Megabits per second (Mbps). Most of the mobile devices can access the network using multiple Radio Access Technologies (RATs). For example, the mobile device includes a Wireless Fidelity (Wi-Fi) interface for accessing a wireless Local Area Network (LAN). The mobile device also includes a cellular interface for accessing a 3$^{rd}$ Generation (3G) network or a Long Term Evolution (LTE) network. Some devices may include more interfaces such as Worldwide Interoperability for Microwave Access (WiMAX). However, the user can use only one interface to get the content from the IP-based network such as Internet at a specific time. When the user wants to download files of hundreds of MBs or to view high-quality videos of hundreds of Mbps, the single data interface may not satisfy the required speed. In this case, the download speed can be lowered and the video can be interrupted frequently.

Hence, the present disclosure provides a platform structure of the mobile device using the multiple radio interfaces at the same time, and algorithms for optimizing the download speed and load balance of the multiple interfaces. The present disclosure allows the user to use the multiple radio data interfaces concurrently without changing applications used in the mobile device. The present disclosure provides the algorithms for the speed and the load balance of the multiple interfaces so that the user can download his/her intended content at the rate corresponding to a sum of the speeds of the available interfaces.

An electronic device can include a plurality of network interfaces for accessing a multimedia service provider which provides at least one multimedia service according to different radio access technologies, and a multi-interface handler for, if an access request for the multimedia service is received from at least one application, dividing the access request to multiple requests and distributing the multiple requests to the interfaces.

The multi-interface handler can include a request handler for generating the multiple requests which request to receive multimedia service data from the service provider via the interfaces at the same time in response to the access request, and distributing the multiple requests to the interfaces. The multi-interface handler can further include a data manager for reassembling the data received via the network interfaces in response to the multiple requests and forwarding the reassembled data to the application.

Data chunks to be received via the interfaces according to the multiple requests can differ from each other. A size of the data chunks to be received via the interfaces according to the multiple requests can be fixed or variable.

The multi-interface handler can further include an interface balancer for detecting a download speed of the data received via the interfaces, and adjusting a download ratio of the interfaces according to the detection result.

The request handler can request an initial chunk of the multimedia service data via the interfaces at a first time point. The request handler can request the remaining data chunk for the multimedia service to be received via the interfaces at a second time point after the first time point according to the download ratio adjusted based on the download speed, detected by the interface balancer, of the initial chunk received via the interfaces.

The interface balancer can detect whether the download ratio of the interfaces changes, and readjusts the download ratio of the interfaces.

The request handler can identify at least one available interface among the interfaces in response to the access request, and generate and provide to the identified interface the multiple requests which request to receive multimedia service data from the service provider via the interfaces at the same time.

The multi-interface handler can further include an interface controller for, if the access request is received, controlling to generate the multiple requests according to the size of the multimedia service data. If receiving the access request, the interface controller can control to generate the multiple requests according to the ratio of the received multimedia service data having a content size smaller than a preset threshold.

The multi-interface handler can further include an interface controller for, if a speed for providing the reassemble data to the application is smaller than a receiving speed of one of the interfaces, controlling to receive the multimedia service data from the service provider via only one interface.

A method for operating an electronic device can include receiving an access request for at least one multimedia service provided by a multimedia service, from at least one application; and dividing the access request to multiple requests and distributing the multiple requests to a plurality of interfaces which access the service provider according to different radio access technologies.

The dividing of the access request to the multiple requests can include generating the multiple requests which request to receive multimedia service data from the service provider via the interfaces at the same time in response to the access request, and distributing the generated multiple requests to the interfaces.

The method can further include reassembling the data received via the network interfaces in response to the multiple requests and forwarding the reassembled data to the application.

Data chunks to be received via the interfaces according to the multiple requests can differ from each other. A size of the data chunks to be received via the interfaces according to the multiple requests can be fixed or variable.

The method can further include detecting a download speed of the data received via the interfaces, and adjusting a download ratio of the interfaces according to the detection result.

The distributing of the generated multiple requests to the interfaces can include requesting an initial chunk of the multimedia service data via the interfaces at a first time point, and requesting the remaining data chunk for the multimedia service to be received via the interfaces at a second time point after the first time point according to the download ratio adjusted based on the download speed, detected by the interface balancer, of the initial chunk received via the interfaces.

The method can further include detecting whether the download ratio of the interfaces changes, and readjusting the download ratio of the interfaces.

The distributing of the generated multiple requests to the interfaces can include identifying at least one available interface among the interfaces in response to the access request, and generating and providing to the identified interface the multiple requests which request to receive multimedia service data from the service provider via the interfaces at the same time.

The method can further include, if receiving the access request, controlling to generate the multiple requests according to the size of the multimedia service data. The controlling can include, if receiving the access request, controlling to generate the multiple requests according to the ratio of the received multimedia service data having a content size smaller than a preset threshold.

The method can further include, if a speed for providing the reassemble data to the application is smaller than a receiving speed of one of the interfaces, controlling to receive the multimedia service data from the service provider via only one interface.

FIG. 1 depicts a network including an electronic device 100 according to an embodiment of the present disclosure.

Referring to FIG. 1, the electronic device 100 includes a bus 10, a processor 20, a memory 30, an Input/Output (I/O) interface 40, a display 50, and a communication interface 60.

The bus 10 can be a circuit for interlinking the above-stated components and transferring communications (e.g., control messages) between the components.

The processor 20 can receive an instruction from the other components (e.g., the memory 30, the I/O interface 40, the display 50, and the communication interface 60) via the bus 10, interpret the received instruction, and process an operation or data according to the interpreted instruction.

The memory 30 can store the instruction or the data received from or generated by the processor 20 or the other components (e.g., the I/O interface 40, the display 50, and the communication interface 60). For example, the memory 30 can include programming modules including a kernel 31, middleware 32, an Application Programming Interface (API) 33, and an application 34. The memory 30 can include a multi-interface processing module 35 for the multi-radio access operation (or function). The programming modules can be implemented using software, firmware, and hardware, or a combination of at least two of them.

The kernel 31 can control or manage system resources (e.g., the bus 10, the processor 20, or the memory 30) used to execute the operation or the function of the other programming modules (e.g., the middle ware 32, the API 33, the application 34, or the multi-interface processing module 35). The kernel 31 can provide an interface allowing the middleware 32, the API 33, the application 34, or the multi-interface processing module 35 to access and to control or manage the individual components of the electronic device 100.

The middleware 32 can relay data between the API 33, the application 34, or the multi-interface processing module 35, and the kernel 31. For the work requests received from the application 34, the middleware 32 can control the work request (e.g., scheduling or load balancing) by giving priority of the system resources (e.g., the bus 10, the processor 20, or the memory 30) of the electronic device 100 to at least one of the applications 34.

The API 33, which is an interface for the application 34 to control the kernel 31 or the middleware 32, can include at least one interface or function (e.g., instruction) for file control, window control, image processing, or text control.

The application 34 can include a Short Message Service (SMS)/Multimedia Messaging Service (MSM) application, an e-mail application, a calendar application, an alarm application, a health care application (e.g., an application for measuring an exercise or a blood sugar), or an environment information application (e.g., an application for providing air pressure, humidity, or temperature information). Additionally or substantially, the application 34 can relate to information exchange between the electronic device 100 and an external electronic device (e.g., an electronic device 100A). The information exchange application can include, for example, a notification relay application for relaying particular information to the external electronic device or a device management application for managing the external electronic device.

For example, the notification relay application can relay the notification information of the other application (e.g., the SMS/MMS application, the e-mail application, the health care application, or the environment information application) of the electronic device 100 to the external electronic device (e.g., the electronic device 100A). Additionally or substantially, the notification relay application can receive and provide the notification information from the external electronic device (e.g., the electronic device 100A) to the user. The device management application can manage (e.g., install, delete, or update) at least part of the function (e.g., power-on/power-off of the external electronic device (or some components) or display brightness (or resolution) control) of the external electronic device (e.g., the electronic device 100A) communicating with the electronic device 100, the application running on the external electronic device, or a service (e.g., a call service or a messaging service) provided by the external electronic device.

The application 34 can include an application designated based on an attribute (e.g., a type of the electronic device) of the external electronic device (e.g., the electronic device 100A). For example, if the external electronic device is a digital audio player, the application 34 can include a music play application. Similarly, if the external electronic device is a mobile medical device, the application 34 can include a health care application. The application 34 can include at least one of the application designated in the electronic device 100 and the application received from the external electronic device (e.g., a server 150 or the electronic device 100A).

The multi-interface processing module 35 provides the multi-radio access function so as to rapidly receive the multimedia service data over the multi-radio access networks via the plurality of the data interfaces at the same time. The multi-interface processing module 35 allows the multimedia service data to be stably received via the plurality of the data interfaces. The multi-interface processing module 35 allows the multimedia service data to be adaptively received via the plurality of the data interfaces or the single interface.

The I/O interface 40 can forward the instruction or the data input from the user through an I/O device (e.g., a sensor, a keyboard, or a touch screen) to, for example, the processor 20, the memory 30, and the communication interface 60 via the bus 10. For example, the I/O interface 40 can forward the data of the user's touch input through the touch screen, to the processor 20. For example, the I/O interface 40 can output the instruction or the data received from the processor 20, the memory 30, and the communication interface 60 via the bus 10, through an I/O device (e.g., a speaker or a display). For example, the I/O interface 40 can output voice data processed by the processor 20 to the user through the speaker.

The display 50 can display various information (e.g., multimedia data or text data) to the user. The communication interface 60 can connect the communication between the electronic device 100 and the external electronic device (e.g., the electronic device 100A or the server 150). For example, the communication interface 60 can communicate with the external device by accessing the network 140 using wireless communication or wired communication. The wireless communication can include at least one of, for example, Wi-Fi, BlueTooth (BT), Near Field Communication (NFC), Global Positioning System (GPS), and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile Communications (GSM)). The wired communication can include at least one of, for example, Universal Serial Bus (USB), High Definition Multimedia Interface (HDMI), Recommended Standard (RS) 232, and Plain Old Telephone Service (POTS).

The network 140 can be a telecommunications network. The telecommunications network can include at least one of a computer network, Internet, Internet of things, and a telephone network. A communication protocol (e.g., transport layer protocol, data link layer protocol, or physical layer protocol) between the electronic device 100 and the external device can be supported by at least one of the application 34, the API 33, the middleware 32, the kernel 31, and the communication interface 60.

Figure 2:
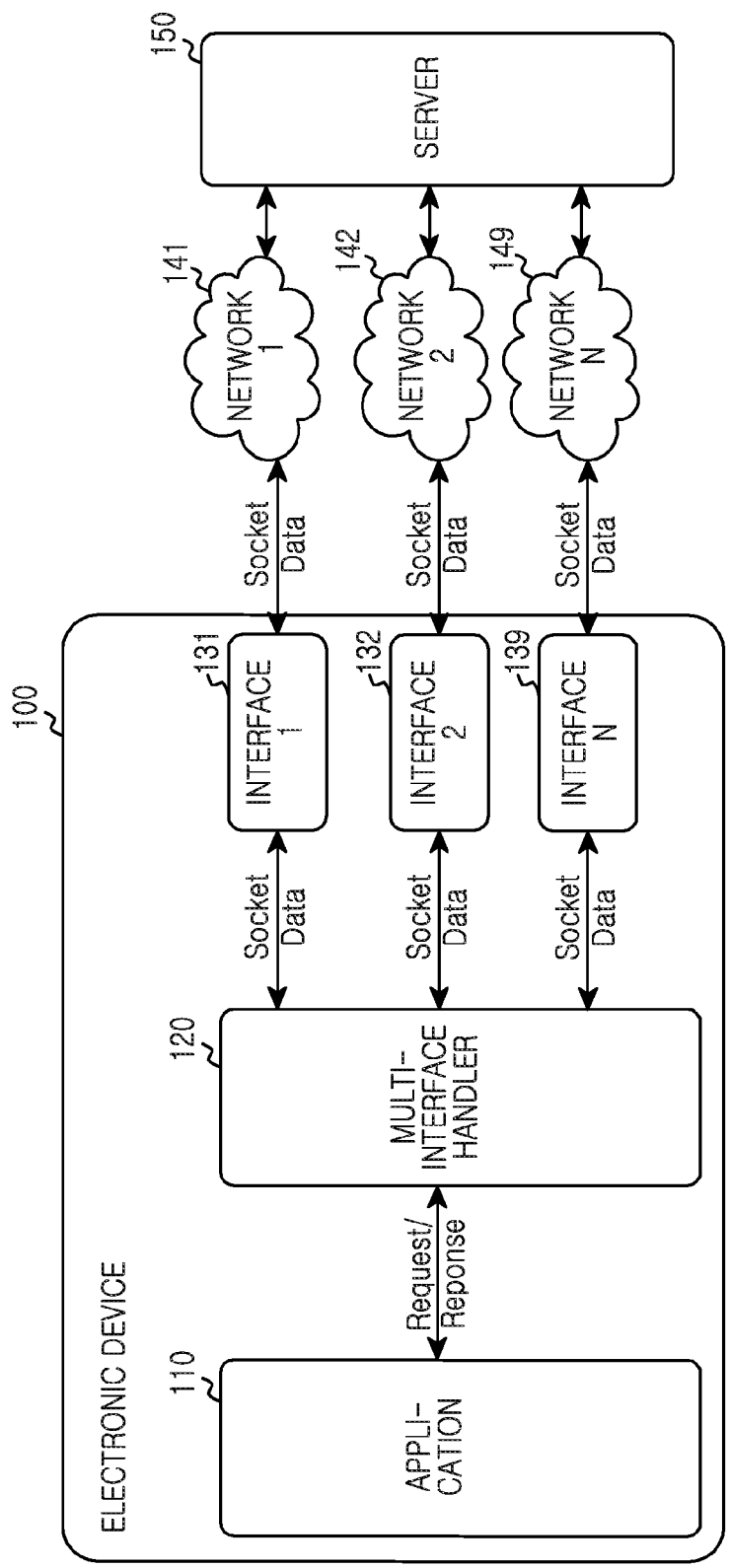
FIG. 2 illustrates an electronic device for multiple radio accesses according to an embodiment of the present disclosure.

FIG. 2 is a block diagram of the electronic device for the multi-radio access according to an embodiment of the present disclosure. Referring to FIG. 2, the electronic device 100 includes an application 110, a multi-interface handler 120, and a plurality of interfaces 131 through 139.

The application 110 can be provided from the server 150 and installed in the electronic device 100. If the application 110 is executed, the corresponding multimedia service of various multimedia services of the server 150 can be provided. Herein, while only one application is installed in the electronic device 100, various applications can be installed. The application 110 can be executed by the user and request the multimedia service data during the execution.

If the request is received from the application 110, the multi-interface handler 120 generates multiple sockets corresponding to the interfaces 131 through 139. That is, the multi-interface handler 120 distributes a particular multimedia service data request to a plurality of requests and provides them to the interfaces 131 through 139 respectively. This is to simultaneously receive (or download) the multimedia service data via the interfaces 131 through 139. In so doing, a data scope requested to the interfaces 131 through 139 is different in order to rapidly or stably receive the multimedia service data via the interfaces 131 through 139. The multi-interface handler 120 can be implemented using a platform to be explained further below.

The interfaces 131 through 139 connect the electronic device 100 to the server 150 over multiple radio access networks 141 through 149. For example, one of the interfaces 131 through 139 can be a Wi-Fi interface. In this case, the corresponding network can be the wireless LAN including an Access Point (AP). For example, one of the interfaces 131 through 139 can be a cellular interface. In this case, the corresponding network can be the 3G network or the LTE network including a Base Station (BS) or an evolved Node B (eNB). The server 150 can be a service provider for providing the multimedia service over the IP-based network such as Internet.

Figure 3:
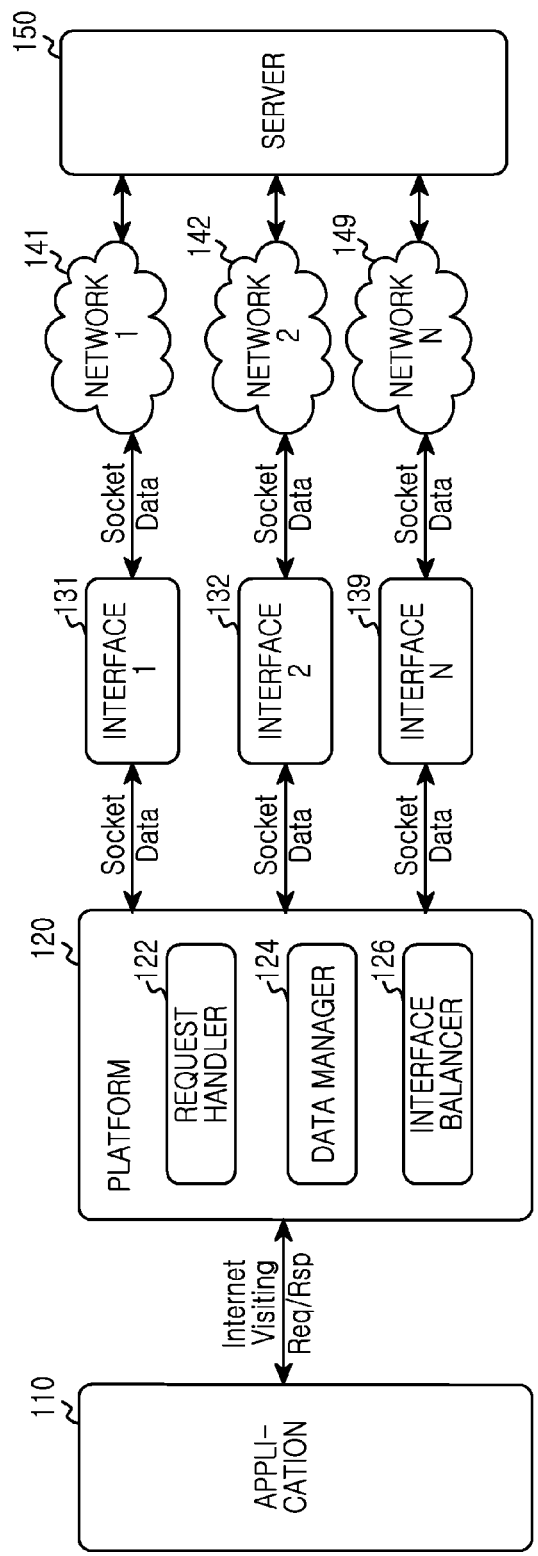
FIG. 3 illustrates an electronic device for a multiple radio accesses according to another embodiment of the present disclosure.

FIG. 3 is a block diagram of the electronic device for the multi-radio access according to an embodiment of the present disclosure. Referring to FIG. 3, the multi-interface handler 120 of FIG. 2 includes a request handler 122, a data manager 124, and an interface balancer 126. The multi-interface handler 120 can be implemented using the platform. The request handler 122, the data manager 124, and the interface balancer 126 can be implemented using software modules as shown in FIG. 1.

Figure 4A:
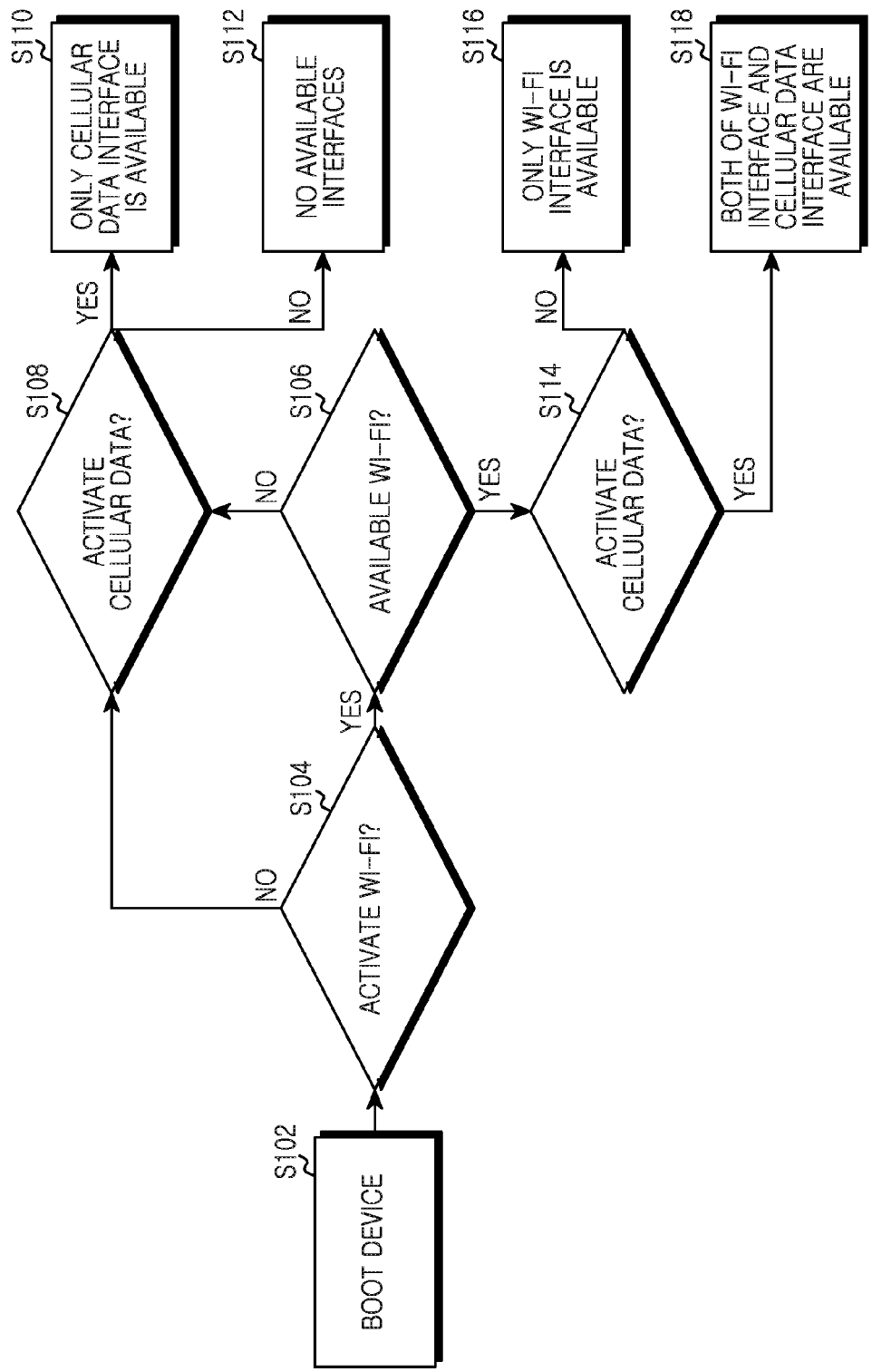
FIG. 4A illustrates a plurality of interfaces for a multiple radio accesses in an electronic device according to an embodiment of the present disclosure.

FIG. 4A depicts a plurality of interfaces available in the electronic device for the multi-radio access according to an embodiment of the present disclosure. The multiple data interfaces can be activated concurrently by updating the platform 120 of the mobile device of FIG. 3. Herein, the Wi-Fi interface and the cellular interfaces are available at the same time by way of example. If the Wi-Fi interface is available with the AP and the cellular interface is available, the platform 120 activates the two data interfaces at the same time.

Referring to FIG. 4A, the electronic device is booted up and the interfaces are activated or deactivated in operation S102. The electronic device determines whether the Wi-Fi interface is activated in operation S104. The electronic device determines whether the Wi-Fi interface is available in operation S106. In operation S108 and operation S114, the electronic device determines whether the cellular data interface is activated. If the Wi-Fi interface is not activated in operation S104 and the cellular data interface is activated in operation S108, the electronic device confirms that only the cellular data interface is available in operation S110. If the Wi-Fi interface is activated in operation S104 but not available in operation S106 and the cellular data interface is activated in operation S108, the electronic device confirms that only the cellular data interface is available in operation S110. In contrast, if the cellular data interface is not activated in operation S108, the electronic device confirms that there is no available interfaces in operation S112.

If the Wi-Fi interface is activated in operation S104 and available in operation S106, and the cellular data interface is not activated in operation S114, the electronic device confirms that only the Wi-Fi interface is available in operation S116. In contrast, if the cellular data interface is activated in operation S114, the electronic device confirms that both of the Wi-Fi interface and the cellular data interface are available in operation S118.

Typically, the terminal can use only one interface. For example, if the user selects the Wi-Fi and accesses the AP, the cellular interface of the corresponding terminal is deactivated. In contrast, if the Wi-Fi is disconnected or the user deactivates the Wi-Fi function, the cellular interface of the corresponding terminal is activated. However, if the user activates the multi-radio access function of the present disclosure, the multiple interfaces are available simultaneously. For example, the interfaces can include the Wi-Fi interface and the cellular data interface of the LTE.

Figure 4B:
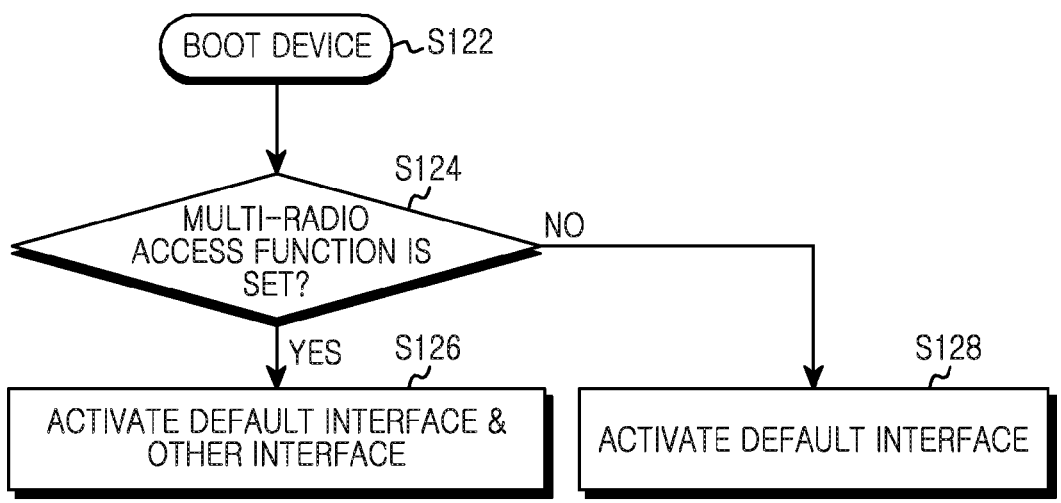
FIG. 4B illustrates a plurality of interfaces activated in an electronic device for a multiple radio accesses according to an embodiment of the present disclosure.

FIG. 4B depicts a plurality of interfaces activated in the electronic device for the multi-radio access according to an embodiment of the present disclosure. Herein, the electronic device concurrently activates, but not limited to, two interfaces.

Referring to FIG. 4B, if the electronic device is booted up in operation S122 and the multi-radio access function is set in operation S124, a default interface (e.g., the Wi-Fi interface) and the other interface (e.g., the LTE interface) are activated in operation S126. If the multi-radio access function is not set in operation S124, only the default interface is activated in operation S128.

The multiple interfaces are activated as shown in FIGS. 5A through 5D and 6, and FIGS. 7A through 7D and 8.

The multiple interfaces are activated if the multi-radio access function is activated and the other interface is activated at the same time. In this case, a delay due to the interface activation can be eliminated by activating the multiple interfaces in advance before using the multiple (e.g., two) interfaces.

Figure 6:
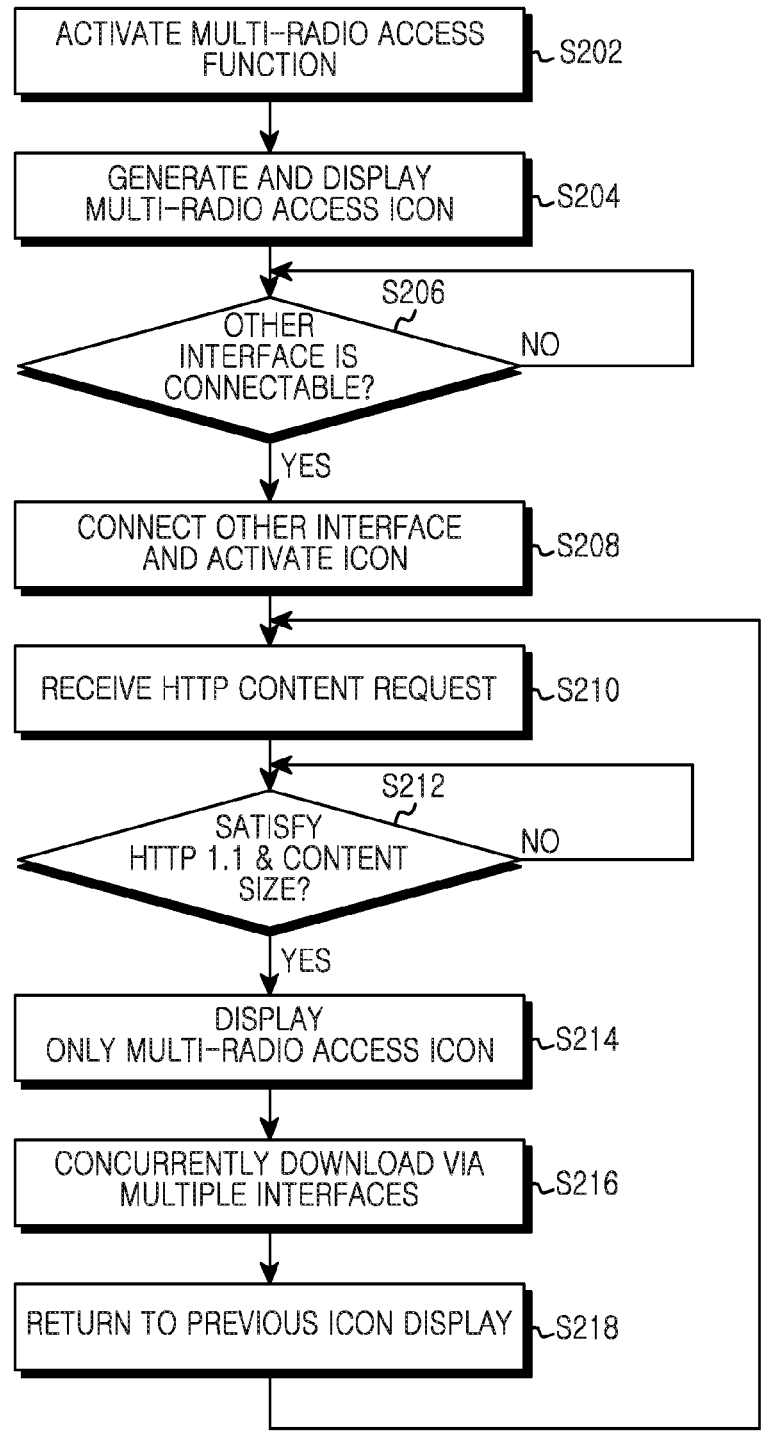
FIG. 6 illustrates a method for processing an activated multi-radio access according to an embodiment of the present disclosure.

FIGS. 5A through 5D depict screens displayed on the electronic device if the multi-radio access function is activated according to an embodiment of the present disclosure. FIG. 6 depicts a method for processing the activated multi-radio access according to an embodiment of the present disclosure.

Referring to FIGS. 5A through 5D, two interface connections are maintained until the user deactivates the multi-radio access function. If the user activates the multi-radio access function S20 in S22, an icon S24 of the multi-radio access function at the top of the display of the electronic device is activated as shown in FIGS. 5A and 5B. In so doing, if the multiple (e.g., two) interfaces are connectable, icons S21 and S23 indicating the corresponding interfaces are activated together as shown in FIG. 5B. If the content is used using the multi-radio access function, the top icons S21, S23, and S24 are replaced by the icon S24 alone of the multi-radio access function as shown in FIG. 5C. If the content use is finished, the original icons are recovered as shown in FIG. 5D.

FIG. 6 is a flowchart of a method for processing the activated multi-radio access according to an embodiment of the present disclosure. This method can be performed by, for example, the multi-interface handler 120 of FIG. 2.

Referring to FIG. 6, the method activates the multi-radio access function in operation S202 as shown in FIG. 5A. The method generates and displays the multi-radio access icon in operation S204 as shown in FIG. 5B. The method determines whether the other interface is connectable in operation S206. If the other interface is connectable, the method connects the other interface and activates the corresponding icon in operation S208 as shown in FIG. 5B. In operation S210, the method receives a HyperText Transfer Protocol (HTTP) content request from the user. In operation S212, the method determines whether the requested content satisfies HTTP 1.1 and a content size. If the requested content satisfies the HTTP 1.1 and the content size, the method displays only the multi-radio access icon in operation S214 as shown in FIG. 5C. In operation S216, the method downloads the requested content through the multiple interfaces at the same time. If the content use is finished, the method recovers the original icon display in operation S218 as shown in FIG. 5D.

Alternatively, the multiple (e.g., two) interfaces are activated concurrently if the multi-radio access function of the present disclosure is activated and then the content is used. In this case, the default interface and the other interface are activated together to utilize the multiple interfaces, which can reduce current consumption for the interface activation.

FIGS. 7A through 7D depict screens displayed on the electronic device if the multi-radio access function is activated according to another embodiment of the present disclosure. FIG. 8 is a flowchart of a method for processing the activated multi-radio access according to another embodiment of the present disclosure.

Figure 7:
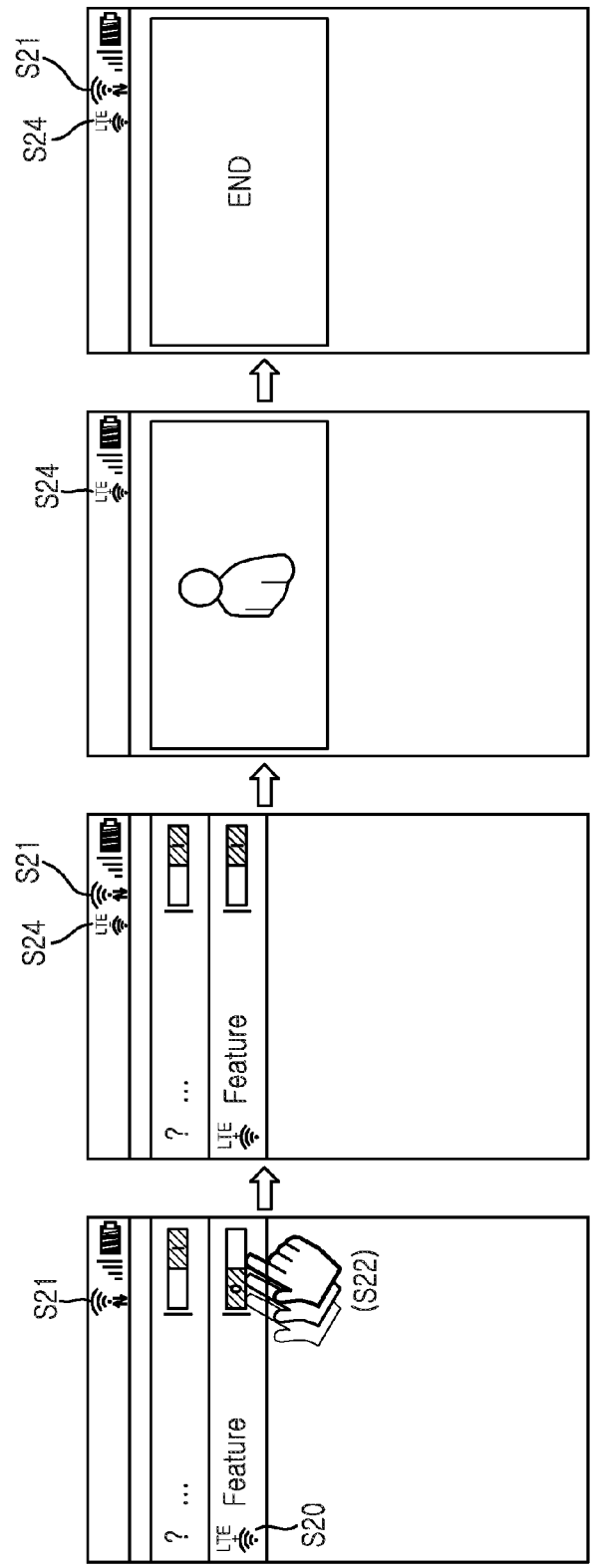
FIGS. 7A, 7B, 7C, and 7D illustrate screens displayed on an electronic device if a multiple radio access is activated according to another embodiment of the present disclosure.
Figure 8:
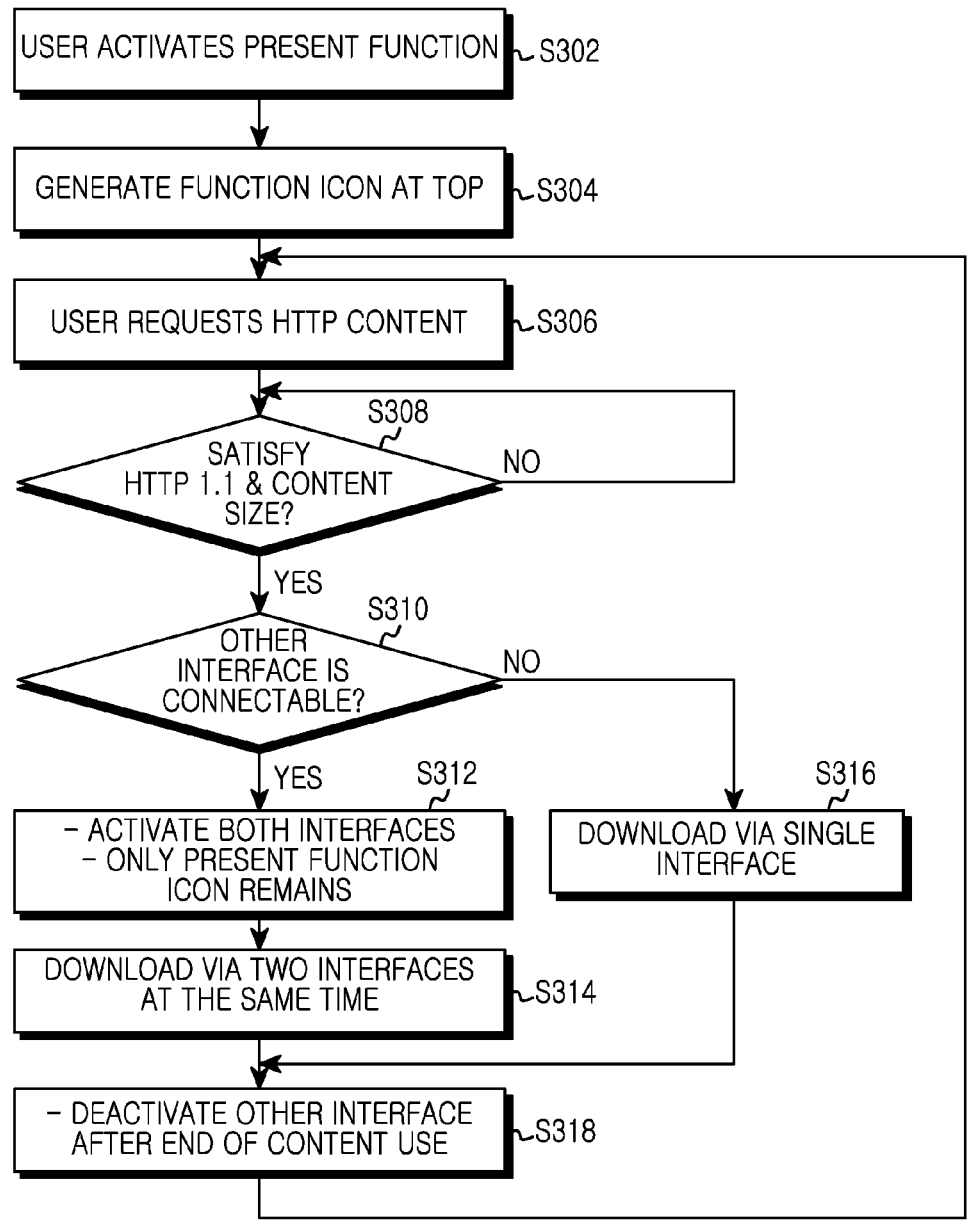
FIG. 8 illustrates a method for processing an activated multi-radio access according to another embodiment of the present disclosure.

Referring to FIGS. 7A through 7D, even if the user activates the multi-radio access function S20 in S22, the other interface is not activated and only the multi-radio access icon S24 is additionally activated (FIGS. 7A and 7B). To use the content using the multi-radio access function, the other interface is activated and the icon at the top of the display of the electronic device is replaced by the multi-radio access icon S24 as shown in FIGS. 7C and 7D. If the content use is finished, the original icons are recovered as shown in FIG. 7D.

FIG. 8 is a flowchart of a method for processing the activated multi-radio access according to another embodiment of the present disclosure. This method can be performed by, for example, the multi-interface handler 120 of FIG. 2.

Referring to FIG. 8, the method activates the multi-radio access function in operation S302 as shown in FIG. 7A. The method generates and displays the multi-radio access icon in operation S304 as shown in FIG. 7B. In operation S306, the method receives the HTTP content request from the user. In operation S308, the method determines whether the requested content satisfies HTTP 1.1 and the content size. If the requested content satisfies HTTP 1.1 and the content size, the method determines whether the other interface is connectable in operation S310. If the other interface is connectable, the method activates the multiple interfaces all together and displays only the multi-radio access icon in operation S312 as shown in FIG. 7C. In operation S314, the method downloads the requested content through the multiple interfaces at the same time. If the other interface is not connectable, the method downloads the content through the single interface (i.e., the default interface) in operation S316. If the content use is finished, the method deactivates the other interface and recovers the original icon display in operation S318 as shown in FIG. 7D.

Referring back to FIG. 3, the request handler 122 intercepts an Internet visiting request and distributes the request to the data interfaces 131 through 139. Hence, the different chunks of the requested data are received from the different networks 141 through 149 via the different data interfaces 131 through 139. For example, if the platform 120 receives a HTTP GET request from the application 110, the request handler 122 checks the available data interfaces and confirms that both of the Wi-Fi and cellular data interfaces are available. The request handler 122 generates the socket for each interface 131 through 139, divides the HTTP GET request into a plurality of HTTP range requests, and distributes the socket bind range requests to the interfaces 131 through 139. Next, the chunks of the request data are received at the interfaces 131 through 139 from the networks 141 through 149. For example, the request handler 122 distributes the range requests of the socket bind to the Wi-Fi interface and the cellular data interface. Next, the requested data chunks are received simultaneously over the Wi-Fi wireless LAN and the cellular network.

The data manager 124 buffers and reassembles the data received from the different sockets bound to the different data interfaces 131 through 139. Since the data are received from the networks 141 through 149 at the same time, the data of the different chunks may not arrive in the same sequence as the original sequence of the requested content. Accordingly, the data manager 124 pushes the received data to a buffer (not shown) and reassembles the buffered data in the same sequence as the original sequence of the requested data. To request the content responded by the application 110, the data manager 124 polls the data from the buffer and returns the data to the application 110.

The download speed of the data interfaces 131 through 139 can vary during the download. The interface balancer 126 detects the download speed of the data interfaces 131 through 139, and allocates the different download chunks to the data interfaces 131 through 139 for the sake of better download speed and load balance.

Figure 9A:
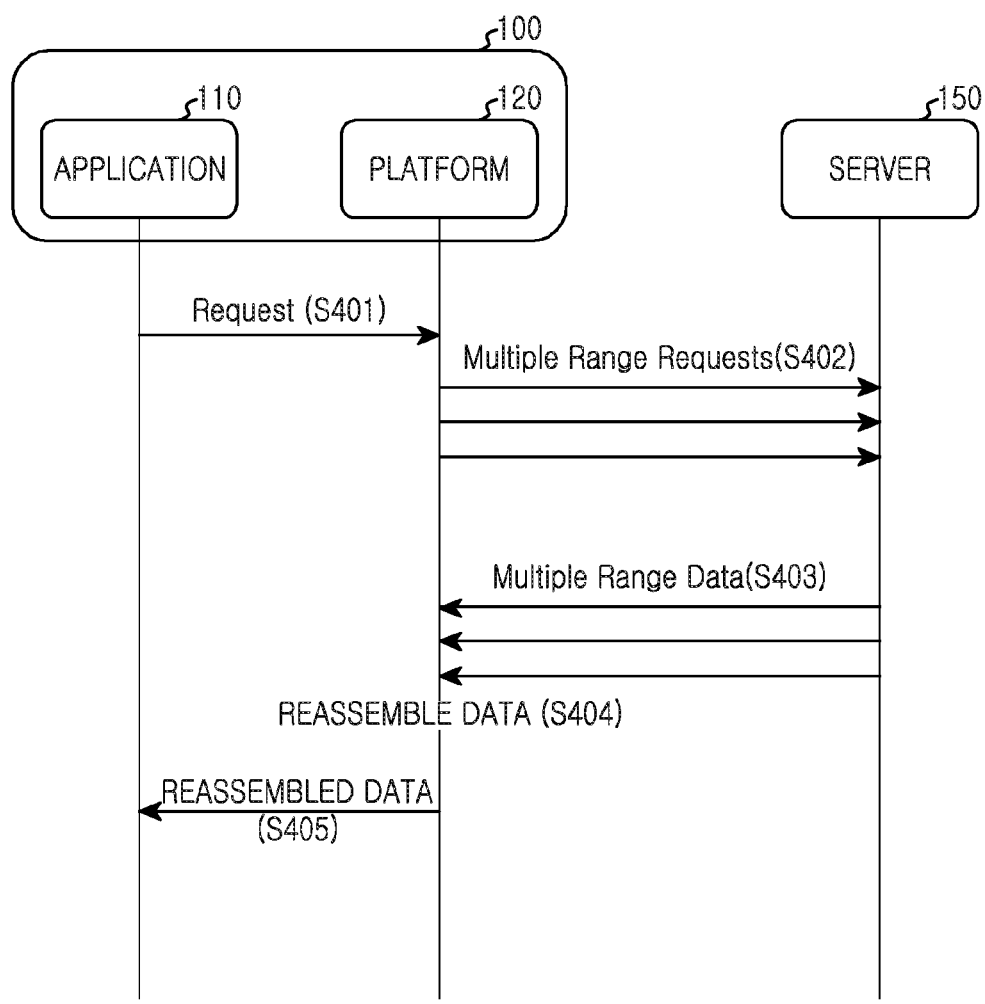
FIGS. 9A and 9B illustrate methods for processing a multi-radio access according to an embodiment of the present disclosure.
Figure 9B:
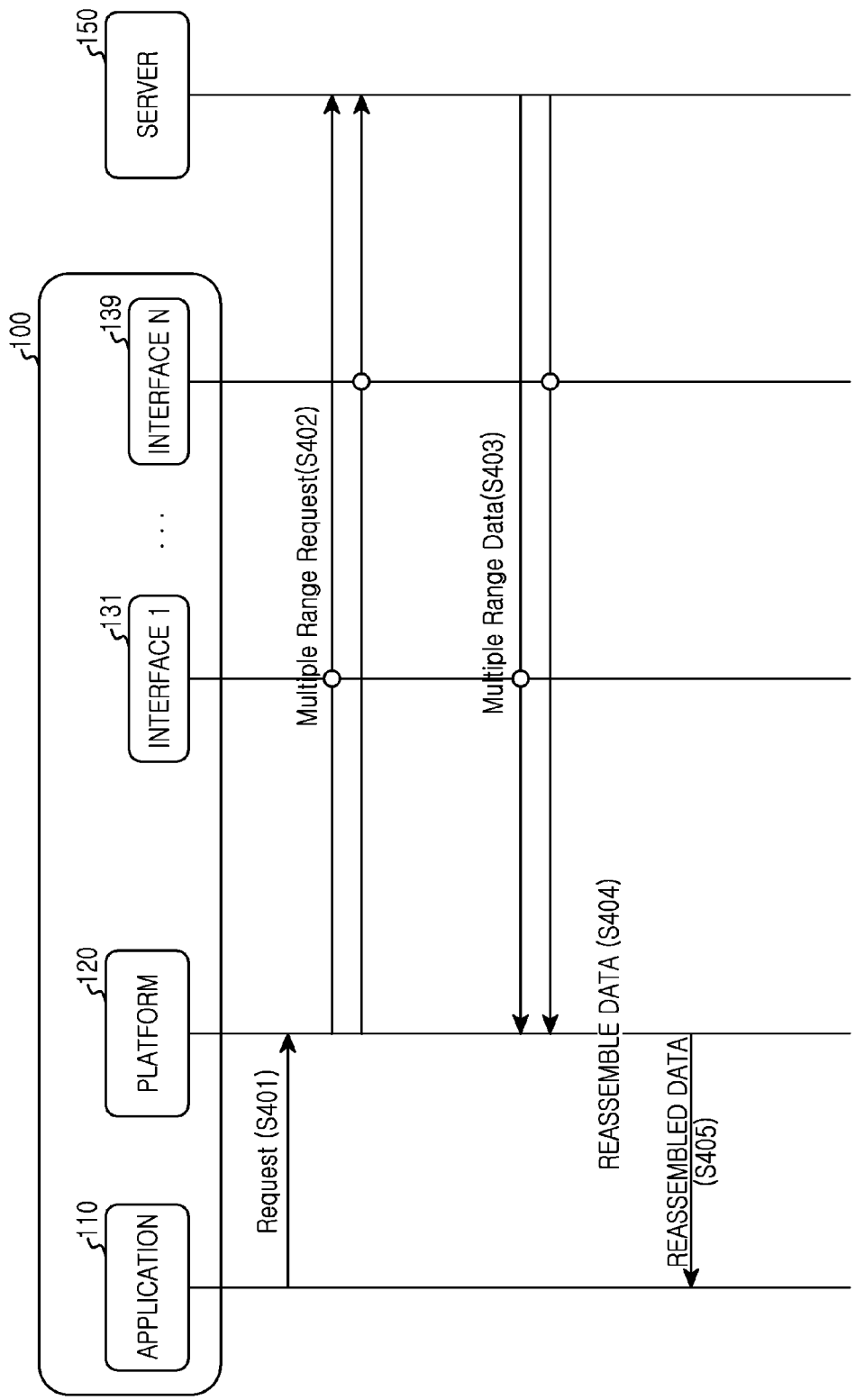

FIGS. 9A and 9B illustrate methods for processing the multi-radio access according to an embodiment of the present disclosure.

Referring to FIGS. 9A and 9B, in the electronic device 100, the application 110 sends to the platform 120 a request for downloading particular multimedia service data (content) from the server 150 in operation S401. In operation S402, the request handler 122 of the platform 120 generates the multiple range requests (e.g., three range requests) in response to the request from the application 110, and provides the multiple range requests to the server 150. The multiple range requests are sent to the server 150 via the corresponding interfaces 131 to 139 and networks as shown in FIG. 9B.

In operation S403, the data manager 124 of the platform 120 receives the multi-range data (e.g., three range data) corresponding to the multiple range requests from the server 150. The multi-range data is received from the server 150 via the corresponding network and interface as shown in FIG. 9B. In operation S404, the data manger 124 of the platform 120 reassembles the received data in the original sequence. In operation S405, the data manger 124 of the platform 120 provides the reassembled data to the application 110.

Such multiple range requests receive the different chunks of the multimedia service content via the multiple interfaces. Various algorithms distribute the requested content by dividing the requested content into the chunks so as to receive them via the different data interfaces.

A best effort algorithm exhibits the fastest download time. The total download time can be short, whereas the download speed can vary, rather than be constant. This algorithm is suitable for file downloading, which corresponds to FIGS. 11, 12, and 13, or FIGS. 14 through 17C. FIGS. 14 through 17C are modified from FIGS. 11, 12, and 13.

A stable speed algorithm achieves a stable download speed throughout the entire downloading period. The download speed in each short interval may not change often. While the total download speed can be much greater than the speed of the single interface, it may not be a maximum speed. This algorithm is suitable for video/audio game playing and other applications requiring the stable throughout, which corresponds to FIGS. 21 through 24.

Figure 10A:
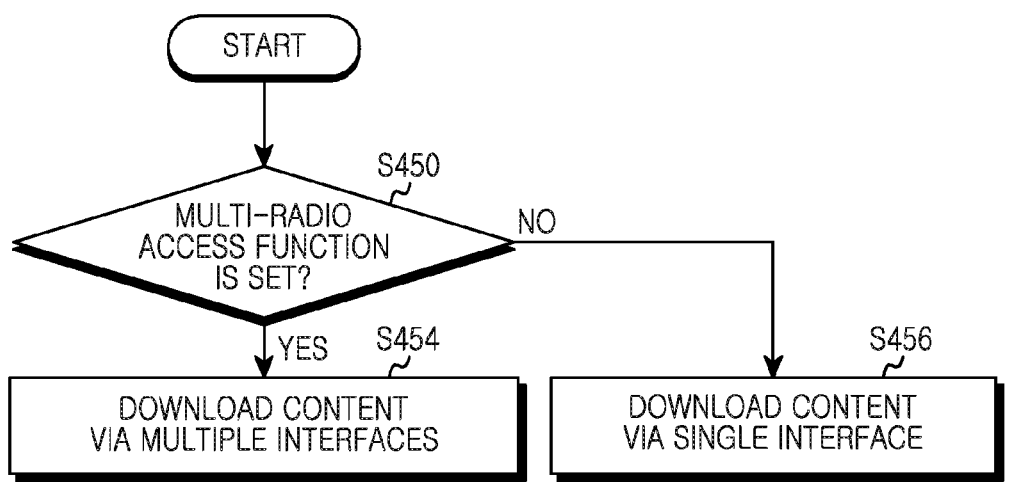
FIGS. 10A, 10B, and 10C illustrate methods for processing a multi-radio access according to an embodiment of the present disclosure.
Figure 10B:
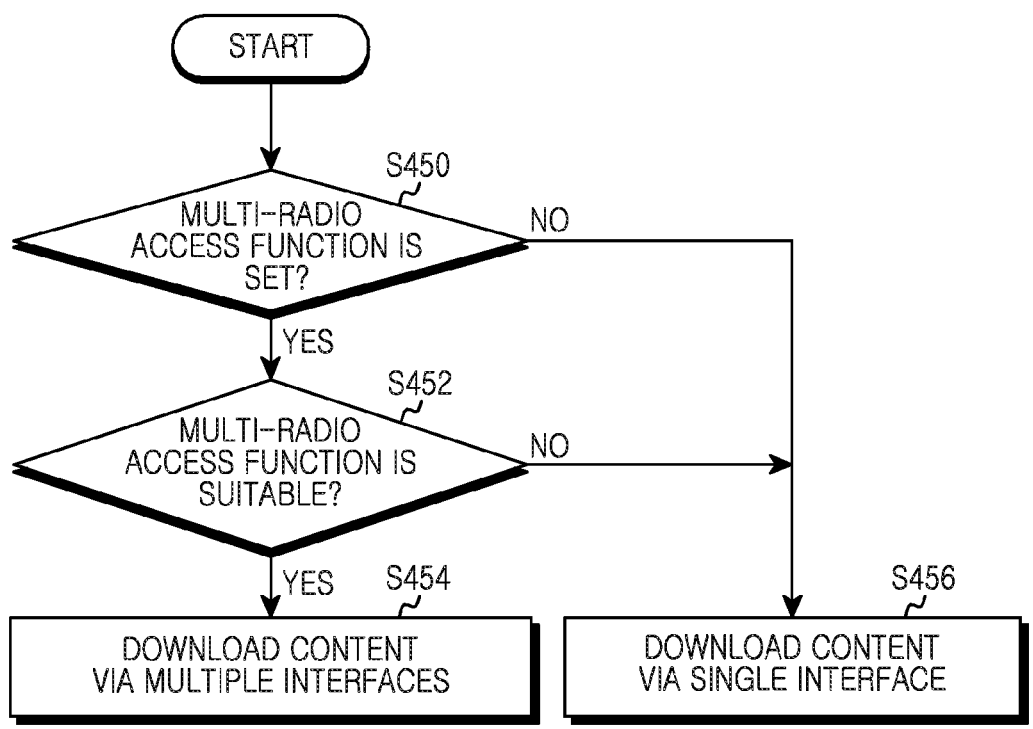
Figure 10C:
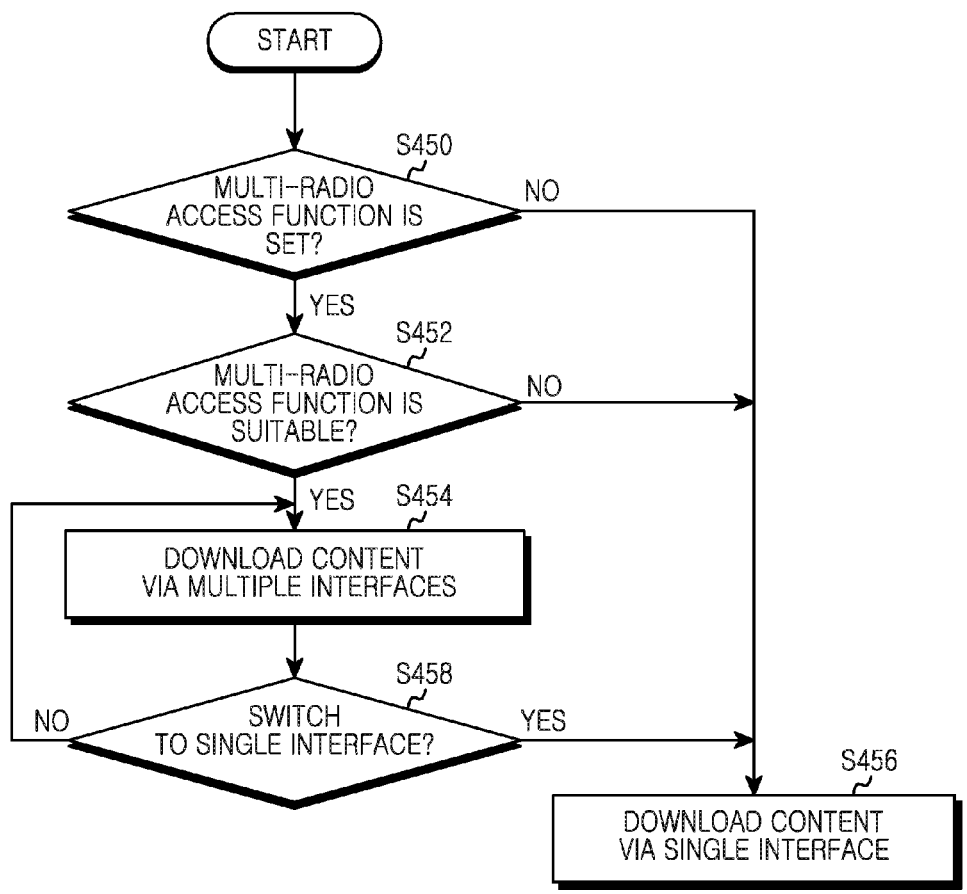

FIGS. 10A, 10B, and 10C illustrate methods for processing the multi-radio access according to an embodiment of the present disclosure. For example, the methods can be performed by the multi-interface handler 120 of FIG. 2.

Referring to FIG. 10A, the method determines whether the multi-radio access function is set in operation S450. If the multi-radio access function is set, the method downloads the content via the multiple interfaces in operation S454. In contrast, if the multi-radio access function is not set, the method downloads the content via the single default interface in operation S456. For example, the multiple interfaces can include two interfaces of the Wi-Fi interface and the LTE interface. In this case, the Wi-Fi interface can be set to the default interface and the LTE interface can be set to the other interface.

Referring to FIG. 10B, the method determines whether the multi-radio access function is set in operation S450. If the multi-radio access function is set, the method determines whether the multi-radio access function is suitable in operation S452. If the multi-radio access function is suitable, the method downloads the content via the multiple interfaces in operation S454. In contrast, if the multi-radio access function is not set or the multi-radio access function is not suitable, the method downloads the content via the single default interface in operation S456.

If the Wi-Fi speed satisfies the application in the mobile device, the Wi-Fi interface is sufficient to download the data. In this case, the multi-radio access function is not suitable.

Alternatively, for a very small content requested, the Wi-Fi interface alone can download the data. In this case, the multi-radio access function is not suitable.

Alternatively, the multi-radio access function is not suitable if the server does not support the multi-radio access. The server does not support the multi-radio access function if the HTTP range request is not supported, if the HTTP range request requires a particular signature of the server, if only one HTTP session is allowed per user, if the server supports the connection only to a particular interface, or if the server transmits different contents per interface.

Referring to FIG. 10C, the method determines whether the multi-radio access function is set in operation S450. If the multi-radio access function is set, the method determines whether the multi-radio access function is suitable in operation S452. If the multi-radio access function is suitable, the method downloads the content via the multiple interfaces in operation S454. In contrast, if the multi-radio access function is not set or the multi-radio access function is not suitable, the method downloads the content via the single default interface in operation S456.

Meanwhile, if it is necessary to switch to the single interface in operation S458 while downloading the content via the multiple interfaces, the method downloads the content via the single interface in operation S456. The switch to the single interface is required if a speed difference between the two interfaces exceeds a certain ratio (e.g., 4 times or 5 times) during the download of the multiple interfaces.

Figure 11:
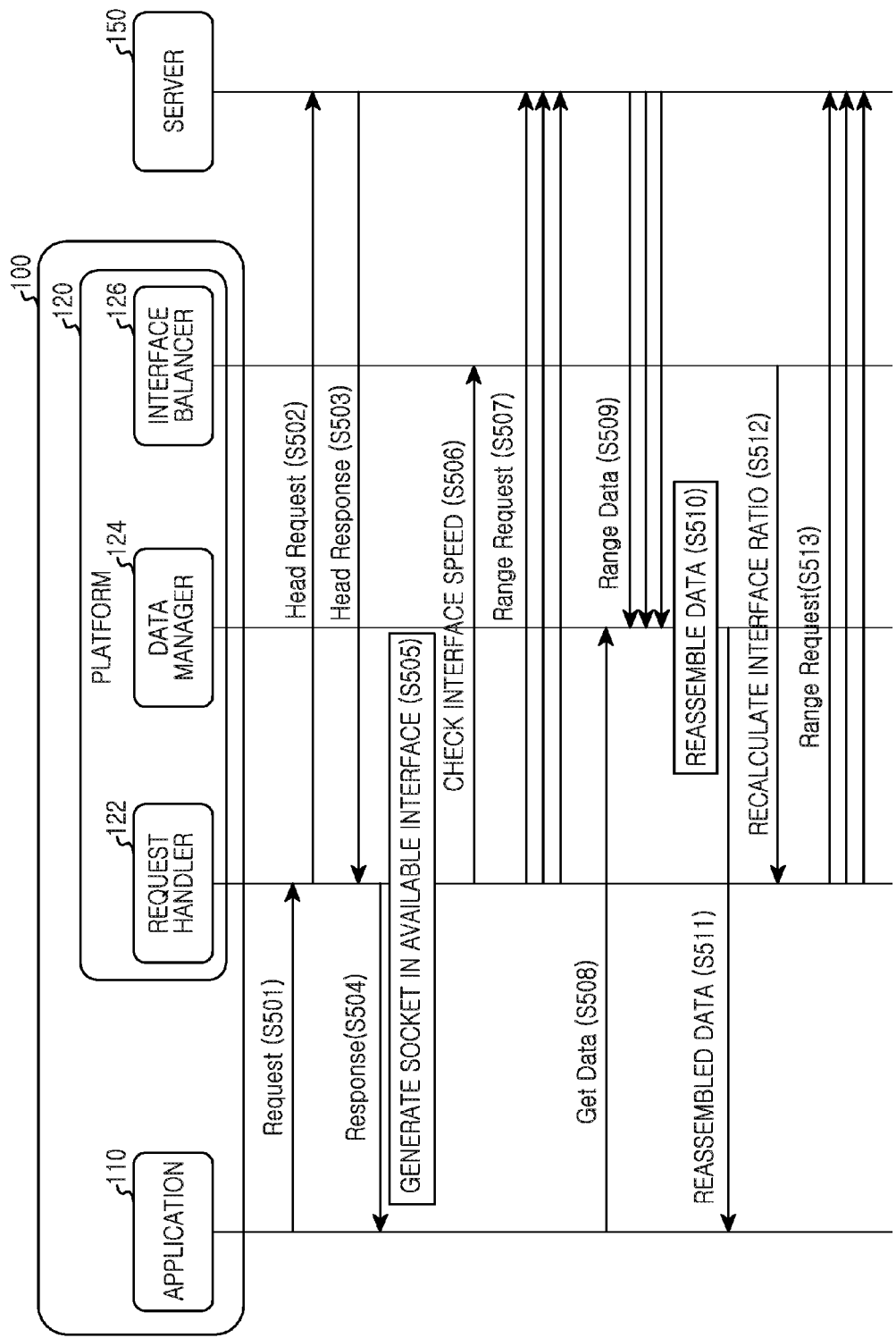
FIG. 11 illustrates a method for processing a multi-radio access according to an embodiment of the present disclosure.

FIG. 11 depicts a method for processing the multi-radio access according to an embodiment of the present disclosure.

Referring to FIG. 11, the application 110 in the electronic device 100 sends the request (e.g., the HTTP GET request) for downloading the content from the server 150 in operation S501.

In operation S502, the request handler 122 in the platform 120 intercepts the request and sends a HEAD request for obtaining only content information, rather than a content body. For example, in HTTP, the request handler 122 sends the HTTP HEAD request. The HEAD request is sent to the server 150.

In operation S503, the request handler 122 receives a HEAD response from the server 150. For example, in the HTTP, the request handler 122 receives the HTTP HEAD response.

In operation S504, the request handler 122 may send a response to the application 110 in reply to the received HEAD response. The response is sent to the application 110 if the adequate HEAD response is not received, for example, if the requested content is not identified or the connection is unavailable. In this case, the process is finished.

In operation S505, if receiving the adequate HEAD response, the request handler 122 identifies all of the available data interfaces, generates the socket for each data interface, and connects the generated socket to the target server 150 which provides the requested data. For example, the mobile device generates the socket for the Wi-Fi interface to access the server 150 over the Wi-Fi wireless LAN, and the socket for the cellular data interface to access the server 150 over the 3G/LTE network.

In operation S506, the request handler 122 notifies the interface balancer 126 to check the speed.

In operation S507, based on the downloading algorithms to be explained, the request handler 122 sends the range request in each socket to get the different chunks of the content. For example, in the HTTP, the request handler 122 sends the HTTP range requests including a scope or range field of the request header, to the server 150. The scope and the size of each chunk are determined by the downloading algorithm to be explained.

In operation S508, the application 110 requests the content data, which continues until the first chunk of the content is received.

If receiving the range data in response to the range request in operation S509, the data manager 124 reads and stores the response data in the buffer.

Since the received data is simultaneously received from the different sockets, the data may not be received in the adequate order. In operation S510, the data manager 124 reassembles the data in the same sequence as the original sequence of the requested content. In operation S511, the data manager 124 returns the reassembled data to the application 110.

In operation S512, the interface balancer 126 recalculates the download rate of the interfaces. If the speed ratio of the data interfaces changes or any data interface is activated or deactivated, the interface balancer 126 recalculates the size and the scope of the chunk to download according to the algorithm to be explained, and notifies the request handler 122 of the range request including the size and the scope of the new download chunk.

In operation S513, regardless of whether the size and the scope of the download chunk are recalculated, after one socket receives every response data of the range request, the request handler 122 sends the other range requests to the server 150 for the next download.

Figure 12:
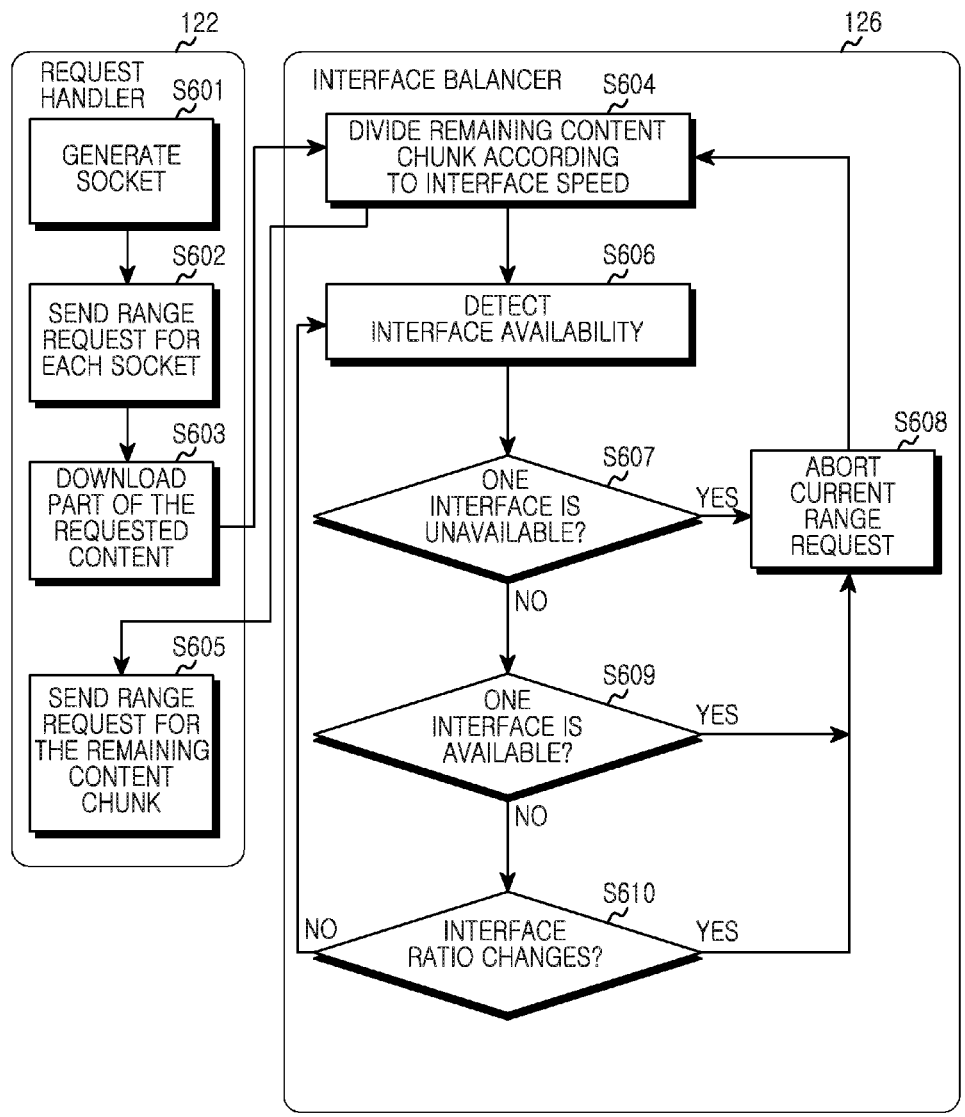
FIG. 12 illustrates a method for processing a multi-range request according to an embodiment of the present disclosure.

FIG. 12 is a flowchart of a method for processing the multi-range request according to an embodiment of the present disclosure.

Referring to FIG. 12, in operation S601, the request handler 122 generates the sockets for the data interfaces. After the sockets are generated and connected, the request handler 122 sends the range request for each socket in operation S602. The range request includes the scope indicating the first chunk to download, and the first chunk can be set to a small chunk.

If first data of the first chunk is downloaded in operation S603, the interface balancer 126 estimates the download speed of the data interfaces, and distributes the other chunks of the download content to the data interfaces based on the download speed ratio in operation S604. The interface balancer 126 divides the remaining content chunks based on Equation 1.

$$Pi=(W-N*I)*Si/\text{SUM}(Si) \qquad \text{Equation 1}$$

Pi denotes the size of the next chunk to download for the data interface socket i, W denotes the total size of the requested content, N denotes the size of the first chunk, and I denotes the number of the available data interfaces. Si denotes the download speed for the data interface socket i. For example, if the total content is 100 MB, the size of the first chunk is 5 MB, and two data interfaces are available, 10 MB (5 MB*2) of the total content 100 MB is received via the two interfaces according to the first range request in operation S602 and accordingly it is necessary to additionally download the remaining content chunk 90 MB. In so doing, according to the ratio of the particular interface speed Si to the total speed SUM (Si) of the two interfaces, the size of the chunk to download via the interface i is determined among the other download content 90 MB. The download speed Si is calculated based on Equation 2.

$$Si=Bi/T \qquad \text{Equation 2}$$

Bi denotes the number of the bytes downloaded from the data interface socket i at a detection time T.

In the first chunk, T denotes the time taken to download the first content of the first chunks. In other cases, T indicates the time interval of the interface balancer 126 for detecting the speed. The request handler 122 sends a range request for the remaining chunk in operation S605.

In operation S606 through operation S610, the interface balancer 126 detects the interface availability of the data interface sockets and the download speed. The download speed is calculated based on Equation 2.

If one interface is not available in operation S607, the interface balancer 126 aborts the current range request in operation S608, divides the rest chunks to download via the one interface based on Equation 1, and distributes the chunks to the other active interfaces.

If a new interface is available or the deactivated interface is available in operation S609, the interface balancer 126 aborts the continuous transmission via all of the sockets in operation S608, divides the remaining content based on the speed ratio, and commences the download according to the new range request.

The interface availability can be determined based on the download speed affecting the data throughput, a signal strength, and other parameters. For example, if the download speed of the interface is smaller than a threshold, the interface is considered as being unavailable. If a Received Signal Strength Indicator (RSSI) of the radio interface is smaller than a threshold, the interface is considered as being unavailable.

In operation S610, the interface balancer 126 determines whether the download speed ratio of the interfaces changes. The speed ratio can vary based on Equation 3. Equation 3 indicates that the speed ratio of the data interfaces changes a lot and thus the current content distribution is not appropriate. In this case, the interface balancer 126 aborts the socket downloading in operation S608 and divides the remaining content based on the new speed ratio of Equation 1 in operation S604.

$$((Si0/Sj0)/(Sit/Sjt) > \text{Threshold}) \text{ or}$$

$$((Sit/Sjt)/(Si0/Sj0) > \text{Threshold}) \quad \text{Equation 3}$$

Si0 and Sj0 denote the download speed of the data interface sockets i and j if the current chunk division is determined, and Sit and Sjt denote the download speed of the interface sockets i and j according to the recent speed detection.

Figure 13:
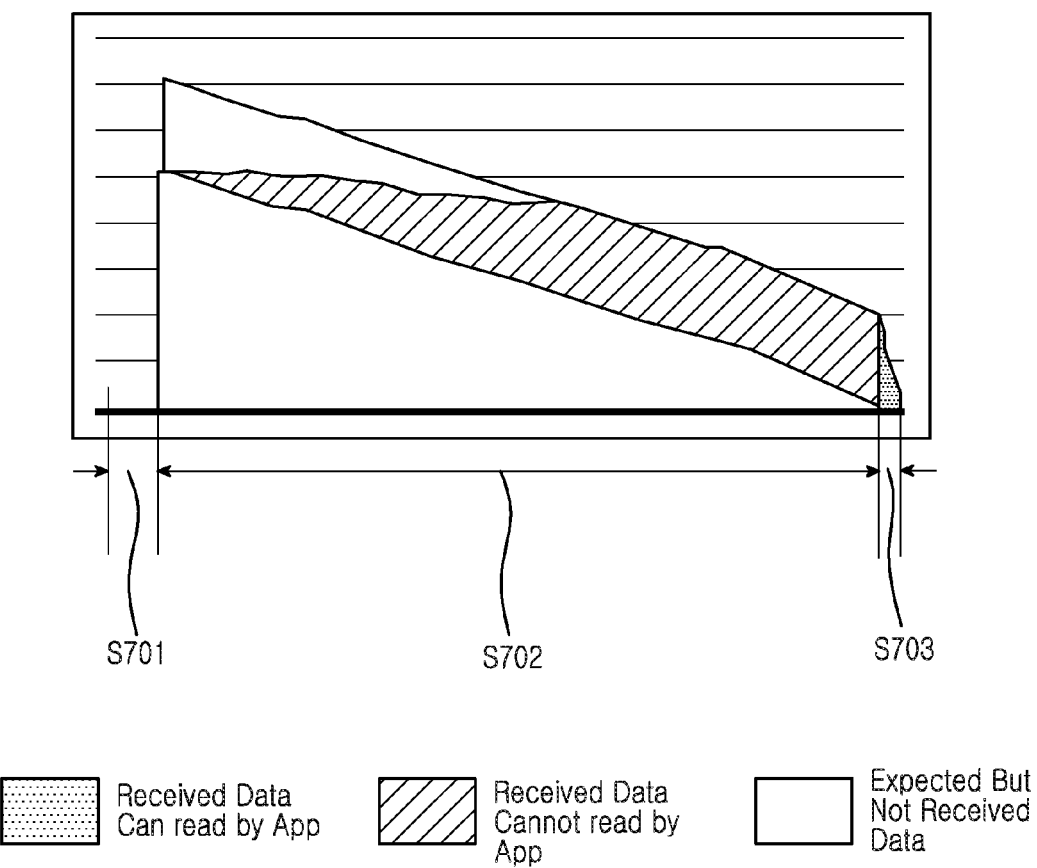
FIG. 13 illustrates a multi-range request according to an embodiment of the present disclosure.

FIG. 13 depicts the multi-range request according to an embodiment of the present disclosure.

Referring to FIG. 13, in an interval S701, the first chunk of the requested content is downloaded from the interfaces and the speed ratio is calculated.

In an interval S702, the remaining content chunk is divided based on the speed ratio and downloaded from the interfaces according to the range request. During the download, the data from the first interface (or the default interface) is read by the application, whereas the data from the second interface (or the other interface) may not be read. This is because data in between the data scope received via the first interface and the data scope received via the second interface may not be received yet. At this time, the speed for the application to read the data is the same as the interface 0.

In an interval S703, all of the data are downloaded and the application can read the data from a memory buffer. The speed for the application to read the data is as fast as a memory copy speed.

While the best effort algorithm can request the data by dividing the data into the small pieces as shown in FIGS. 11, 12, and 13, it may divide the total data into the number of the interfaces and receive the data distributed per interface in order to minimize overhead of the initial connection caused in the range request transmission. For example, if two interfaces include the default interface and the other interface, the whole data can be divided and received in two portions including the former chunk and the latter chunk. If one data chunk distributed is downloaded completely ahead of the other chunk, the other data chunk is re-divided and received all together. This algorithm relates to the methods of FIGS. 14 through 17C and receives the data non-sequentially, unlike the other algorithms which sequentially request and receive the data.

Figure 14:
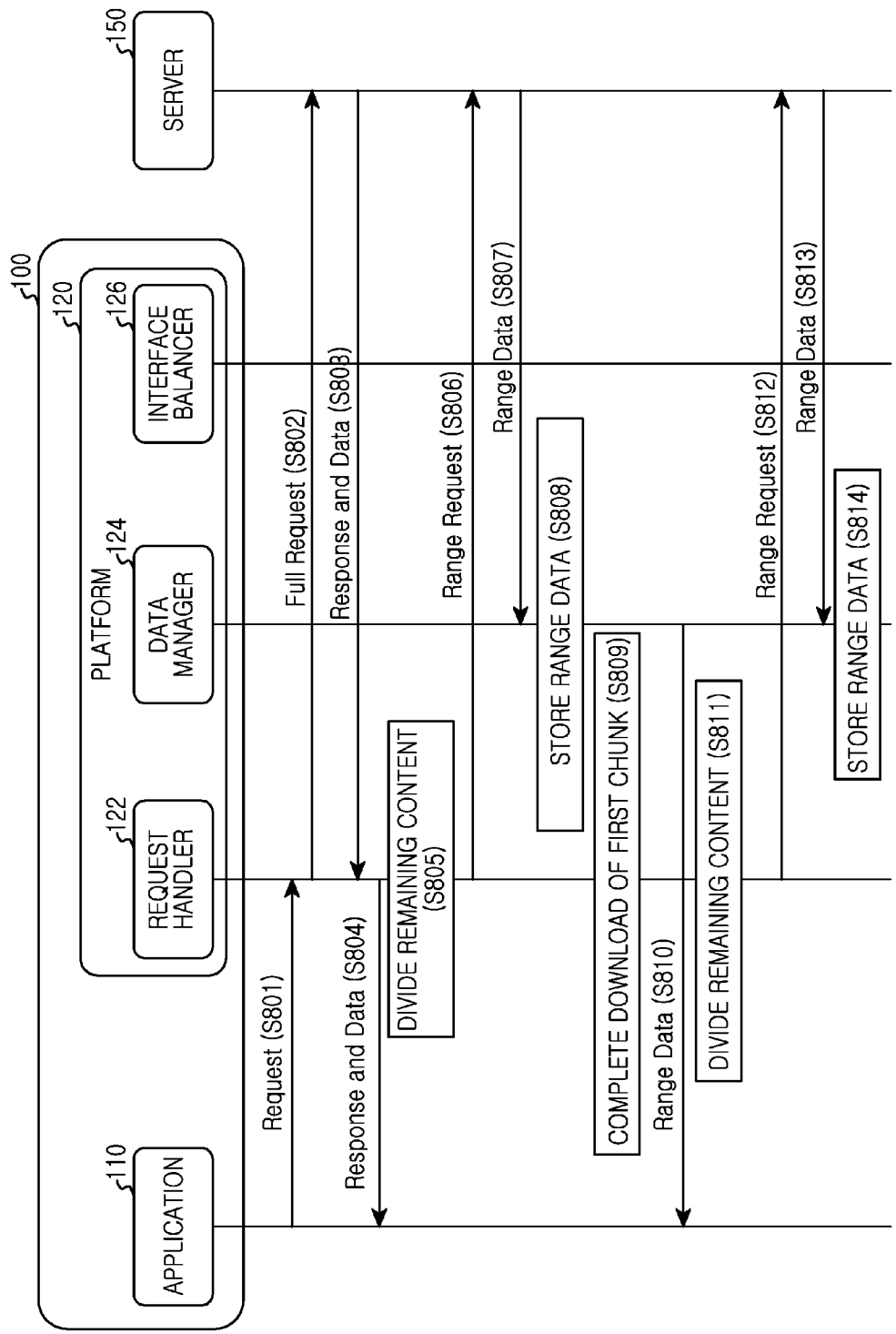
FIG. 14 illustrates a method for processing a multi-radio access according to another embodiment of the present disclosure.

FIG. 14 illustrates a method for processing the multi-radio access according to yet another embodiment of the present disclosure. Herein, the multi-range request is performed by the two interfaces of the default interface and the other interface.

Referring to FIG. 14, in operation S801, the application 110 in the electronic device 100 sends the request (e.g., the HTTP GET request) for downloading the content from the server 150.

In operation S802, the request handler 122 of the platform 120 intercepts the request and sends the full request for the whole content to the sever 150.

In operation S803, the request handler 122 receives the response and the data for the full request from the server 150.

In operation S804, the request handler 122 forwards the response and the data of the full request to the application 110. The request handler 122 can determine the requested content size and the range request availability by receiving the full request response. If the requested content size exceeds a preset size and the server 150 supports the range request, the request handler 122 calculates the latter chunk size to receive via the other interface with respect to the remaining content excluding the content received via the default interface, in association with the interface balancer (or a speed watchdog) 126 in operation S805. The calculation can be performed based on Equation 4 to be explained.

In operation S806, the request handler 122 sends the range request corresponding to the latter chunk size of the remaining content calculated, to the server 150 via the other interface.

The data manager 122 receives the data of the range request from the server 150 in operation S807, and reads and stores the received data in its internal storage (e.g., a buffer) in operation S808.

In operation S809, the request handler 122 determines which one of the former chunk and the latter chunk of the remaining content calculated in operation S805, is completely downloaded.

If either the former chunk or the latter chunk of the remaining content requested is completely downloaded, the data manager 124 forwards the downloaded data to the application 110 in operation S810.

If the whole data is not completely downloaded, in operation S811 through operation S814 are performed for the remaining content not downloaded, which are the same as operation S805 through operation S808, and thus a description thereof are not repeated herein for conciseness in explanation.

If the whole data is completely downloaded, operation S811 through operation S814 may not be conducted.

Figure 15:
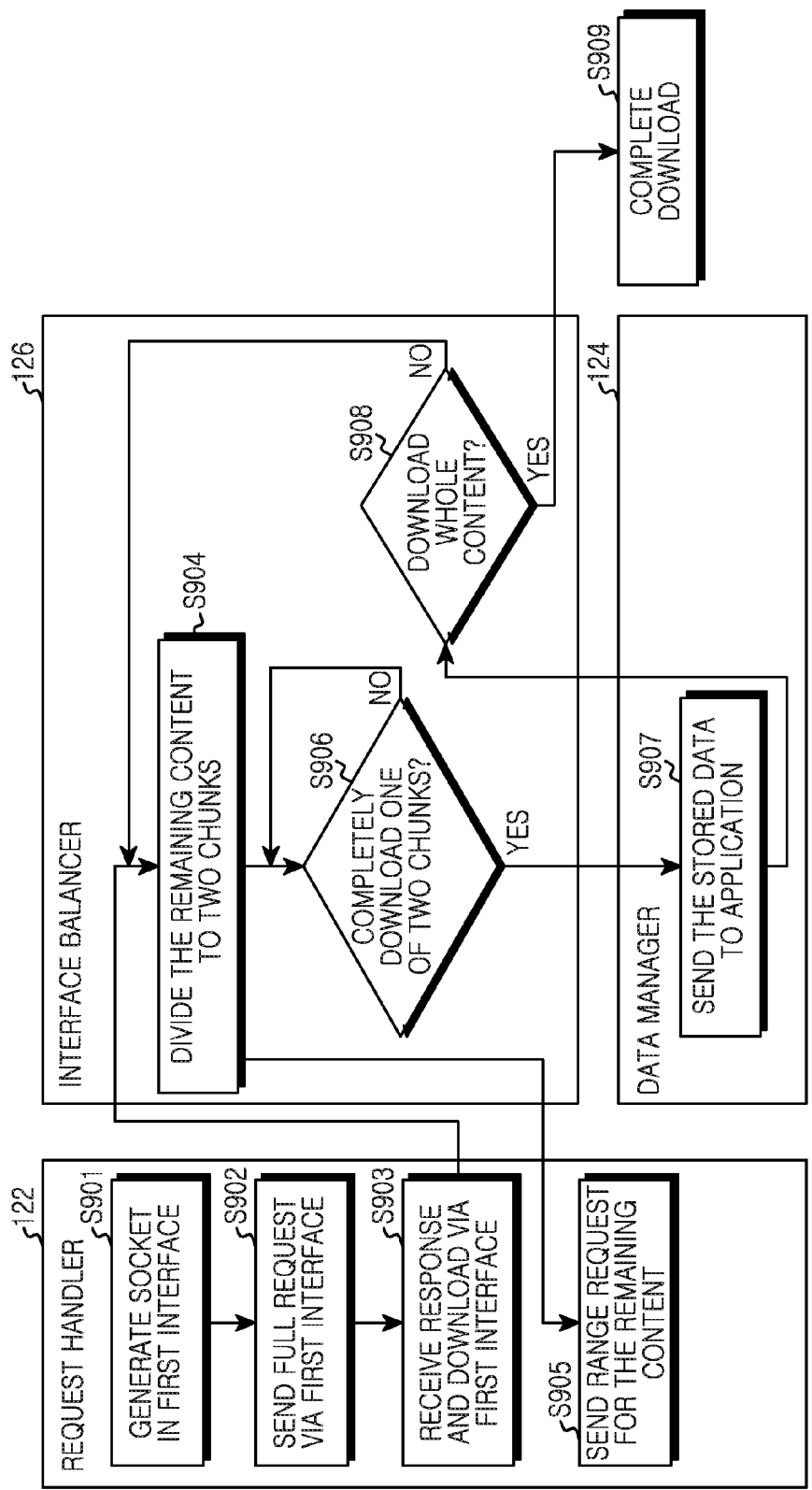
FIG. 15 illustrates a method for processing a multi-range request according to another embodiment of the present disclosure.

FIG. 15 illustrates a method for processing the multi-range request according to another embodiment of the present disclosure. Herein, the multi-range request is performed by the two interfaces of the default interface and the other interface.

Referring to FIG. 15, if the application 110 issues the HTTP request, the request handler 122 generates the socket for the default interface in response to the request operation S901. In operation S902, the request handler 122 forwards the HTTP request to the server 150 via the default interface. The request requests the whole content.

In operation S903, the request handler 122 determines the requested content size and the range request availability by receiving the HTTP response of the HTTP request. If the requested content size exceeds the preset size and the server 150 supports the range request, the request handler 122 requests the interface balancer (or the speed watchdog) 126 to calculate the range request scope. In so doing, the default interface continues the download.

In operation S904, the interface balancer 126 determines the latter chunk size to receive via the other interface with respect to the remaining content excluding the content received via the current default interface. In so doing, the interface balancer 126 calculates the latter chunk size to receive via the other interface by use of the speed ratio R of the two interfaces based on Equation 4.

Chunk size=Remaining Content Size/(R+1)     Equation 4

R=Speed of default interface/Speed of the other interface.

Without the measured speed or the speed information obtained from the previous download, R=1 is determined and thus ½ of the remaining data is determined as the latter chunk size.

In operation S905, the request handler 122 generates based on the chunk size determined in operation S904 and sends the HTTP range request to the server 150 via the other interface.

If either the former chunk or the latter chunk of the remaining content requested is completely downloaded in operation S906, the data manager 124 forwards the downloaded data to the application 110 or temporarily stores the downloaded data in its internal storage (e.g., the buffer) in operation S907. For example, if the former chunk of the remaining content is completely downloaded, the data manager 124 forwards the front chunk of the downloaded content to the application 110 in operation S907. For example, if the latter chunk of the remaining content is completely downloaded, the data manager 124, which cannot directly forward the latter chunk of the downloaded content to the application 110, temporarily stores the downloaded data in the internal storage (e.g., the buffer).

If the whole data is not completely downloaded operation S908, the interface balancer 126 splits the other chunk being downloaded and receives the latter split chunk via the interface which completes the download in operation S904. In so doing, the partition rate is equal to Equation 4, whereas the interface balancer 126 does not split the content under a particular condition. For example, if the download of the corresponding content chunk via the allocated interface is about to end within a particular time (e.g., within 4 seconds), the interface balancer 126 does not further divide the content. For example, if the remaining content size is smaller than a particular size (e.g., 1 MB), the interface balancer 126 does not split the content any more.

If the whole data is completely downloaded operation S908, the download of the requested content is finished in operation S909.

In FIGS. 14 and 15, the multi-interface handler 120 splits the whole content into the number of the interfaces (e.g., two), requests the content to the server 150, and receives the distributed data via the respective interfaces. Thus, the download of the whole content is completed. The content to be downloaded via the interfaces may be distributed once as shown in FIGS. 16A and 16B or twice as shown in FIGS. 17A, 17B, and 17C according to the progress of the download.

Figure 16A:
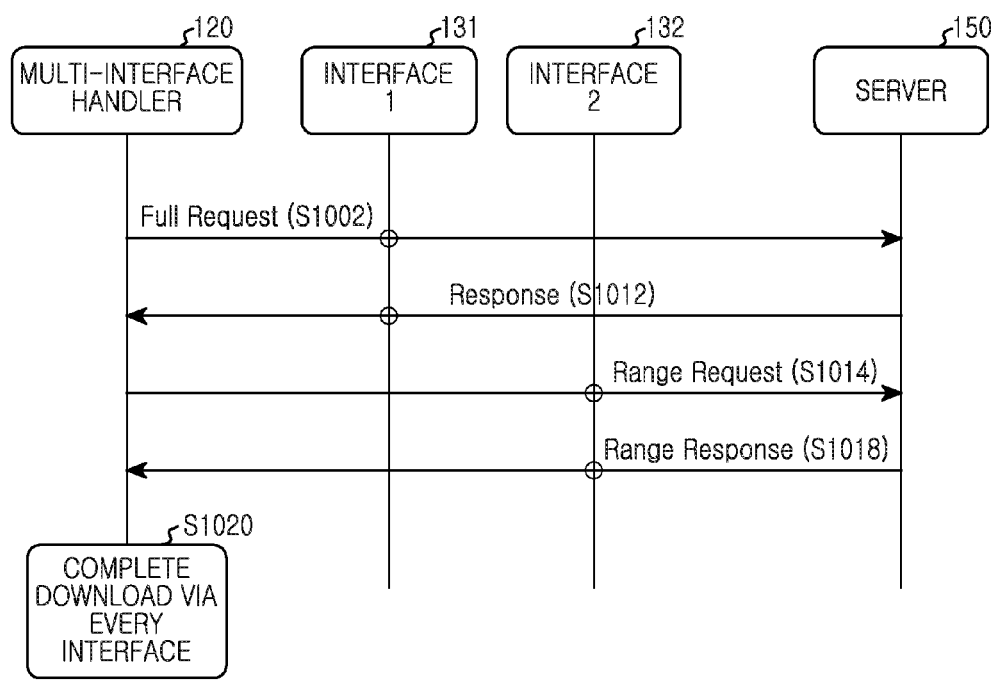
FIG. 16A illustrates operations of a multi-interface handler for a multi-radio access according to another embodiment of the present disclosure.
Figure 17A:
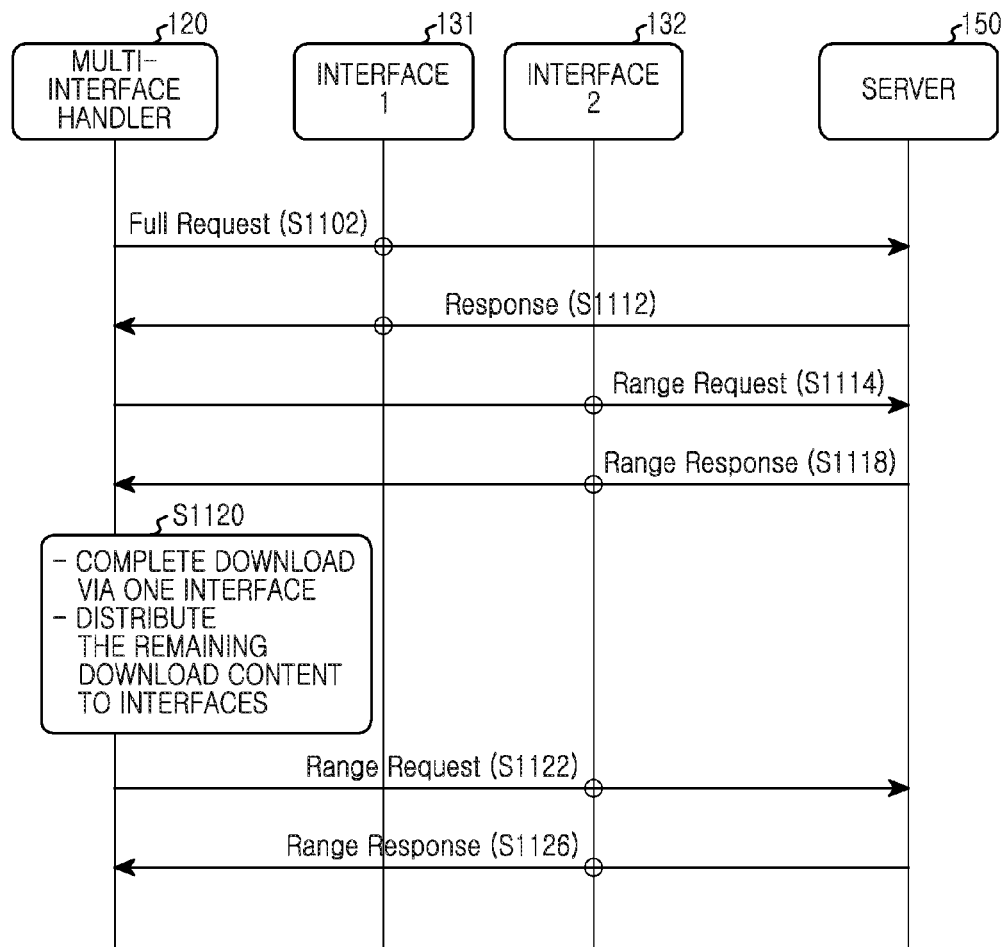
FIGS. 17A and 17C illustrate operations of a multi-interface handler for a multi-radio access according to yet another embodiment of the present disclosure.
Figure 17B:
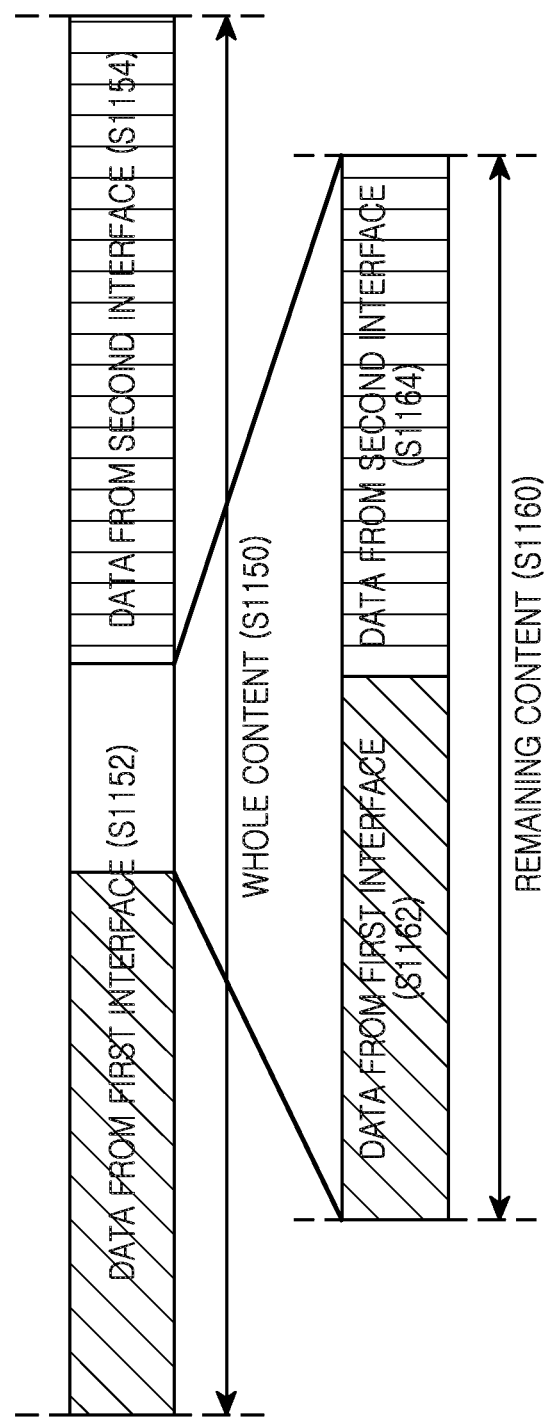
FIGS. 17B and 17D illustrate contents downloaded according to a multi-radio access according to yet another embodiment of the present disclosure.
Figure 17C:
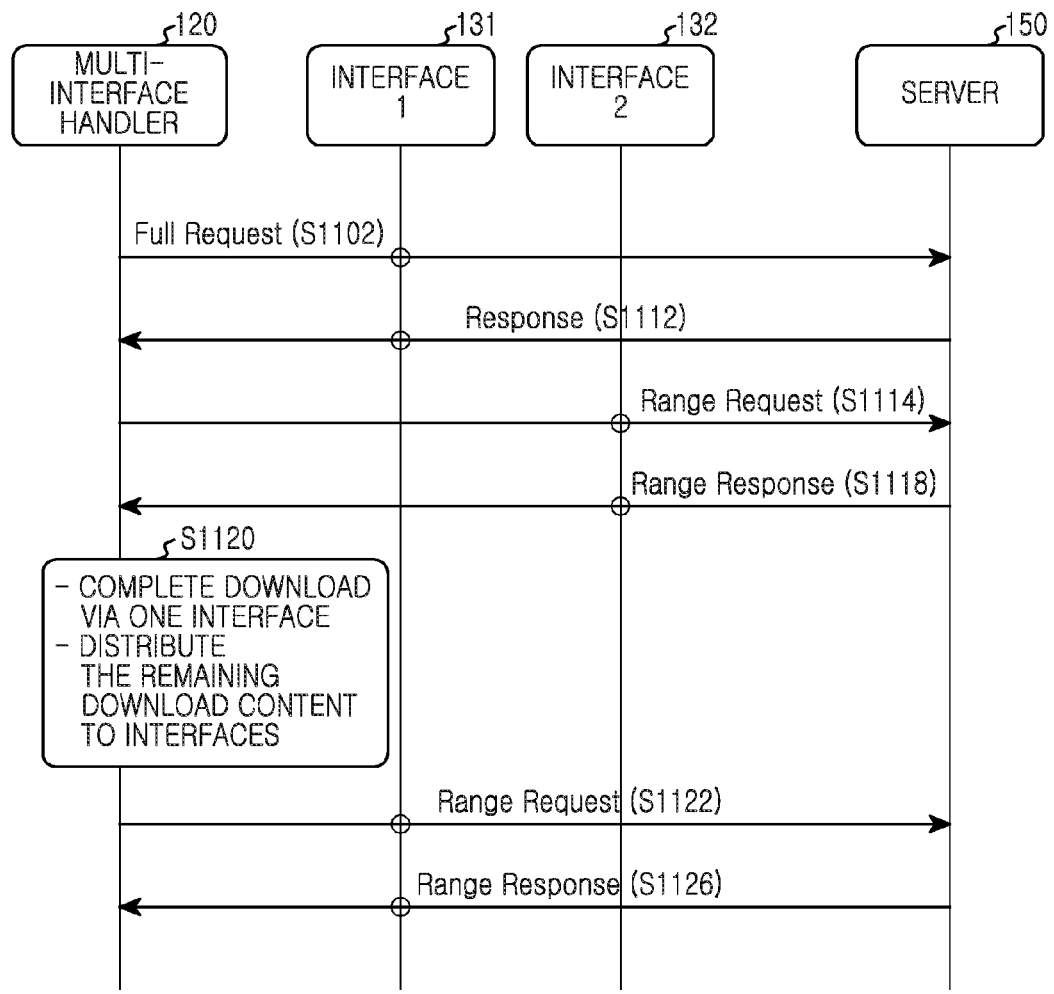

FIG. 16A illustrates operations of the multi-interface handler for the multi-radio access according to another embodiment of the present disclosure.

Referring to FIG. 16A, the multi-interface handler 120 forwards the download request Full Request for the whole content to the server 150 in operation S1002. If receiving the response of the download request from the server 150 in operation S803 and operation S804 of FIG. 14, the multi-interface handler 120 divides the remaining content to download based on the interfaces and forwards the range request to the server 150 so as to download the corresponding content via the corresponding interface. In operation S1012, the multi-interface handler 120 receives and processes the response of the Full Request. If the remaining content is divided to be downloaded via the two interfaces 131 and 132, the multi-interface handler 120 forwards the range request to the server 150 to download the other chunk (e.g., the latter chunk) of the remaining content via the second interface 132 being the other interface in operation S1014.

In operation S1012 and operation S1018, the multi-interface handler 120 receives and processes the response of the Full Request and the range request. In operation S1012, the multi-interface handler 120 receives the former chunk of the remaining content received according to the Full Request, from the server 150 via the first interface 131. If the content is received in operation S1012 until the start of the other chunk (e.g., the latter chunk) of the requested remaining content in operation S1014, the reception is aborted. In operation S1018, the multi-interface handler 120 receives the latter chunk of the remaining content corresponding to the range request for the latter chunk of the remaining content, from the server 150 via the second interface 132.

The multi-interface handler 120 forwards the remaining content downloaded via the first interface 131 and the second interface 132 to the application 110 in operation S1020, and the download via all of the interfaces is complemented.

FIG. 16B depicts the contents downloaded according to the multi-radio access according to another embodiment of the present disclosure. The contents are downloaded according to the method of FIG. 16A.

Referring to FIG. 16B, the multi-interface handler 120 processes to download the initial chunk data of the whole data via the first interface 131 during period S1050 and to forward the downloaded data to the application 110 during period S1052, and processes to download the front chunk of the remaining content via the first interface 131 and to forward it to the application 110 in during period S1054. The multi-interface handler 120 processes to download via the second interface 132 and store the latter chunk of the remaining content of the whole content in the internal storage in during period S1056. S1056 indicates the time for the application 120 to read the data downloaded via the first interface 131, and is equal to the download time of the first interface 131. Period S1058 indicates the time for the application 120 to read the data downloaded and stored via the second interface 132.

As above, it is advantageous to minimize the number of sessions newly created in the content download via the multiple interfaces. Hence, the interface (e.g., the second interface 132) for the new download downloads the latter chunk of the remaining content, and the interface (e.g., the first interface 131) in the process of the download continues the download of the former chunk of the remaining content without creating a new session.

FIG. 17A depicts operations of the multi-interface handler for the multi-radio access according to yet another embodiment of the present disclosure.

Referring to FIG. 17A, the multi-interface handler 120 forwards the download request Full Request for the whole content to the server 150 in operation S1102. If receiving the response of the download request from the server 150 as in operation S803 and operation S804 of FIG. 14, the multi-interface handler 120 distributes the remaining content to download to the interfaces and forwards the range request to the server 150 so as to download the corresponding content via the corresponding interface. In operation S1112, the multi-interface handler 120 receives and processes the response of the Full Request. If the remaining content is distributed to the two interfaces 131 and 132, the multi-interface handler 120 forwards the range request to the server 150 so as to download the other chunk (e.g., the latter chunk) of the remaining content via the second interface 132 being the other interface in operation S1114.

In operation S1112 and operation S1118, the multi-interface handler 120 receives and processes the response of the Full Request and the range request. In operation S1112, the multi-interface handler 120 receives the former chunk of the remaining content received according to the Full Request, from the server 150 via the first interface 131. If the content is received in operation S1012 until the start of the other chunk (e.g., the latter chunk) of the remaining content requested in operation S1014, the reception is aborted. In operation S1118, the multi-interface handler 120 receives the latter chunk of the remaining content corresponding to the range request for the latter chunk of the remaining content, from the server 150 via the second interface 132.

If completing the download via either the first interface 131 or the second interface 132, the multi-interface handler 120 re-distributes the remaining content to download to the interfaces and forwards the range request to the server 150 so as to receive the corresponding content via the corresponding interface in operation S1120. If the remaining content is re-distributed to the two interfaces 131 and 132, the multi-interface handler 120 forwards the range request to the server 150 so as to download the other chunk (e.g., the latter chunk) of the remaining content re-distributed, via the interface which completes the download in operation S1120, in operation S1122. Referring to FIG. 17A, the second interface 132 completes the download first and the new range request is forwarded to the server 150 via the second interface 132 in operation S1122.

The multi-interface handler 120 receives and processes the response of the range request in operation S1126. In operation S1126, the multi-interface handler 120 receives the latter chunk of the re-distributed remaining content corresponding to the range request for the latter chunk of the re-distributed remaining content, from the server 150 via the second interface 132.

FIG. 17B depicts contents downloaded according to the multi-radio access according to yet another embodiment of the present disclosure. If the remaining content is distributed and downloaded via the interfaces as shown in FIG. 17A, the download of the second interface 132 is finished first.

Referring to FIG. 17B, the whole content S1150 is divided such that the former chunk data S1152 and the latter chunk data S1154 are downloaded via the first interface 131 and the second interface 132 respectively. In this case, the download of the latter chunk data S1154 of the content S1150 via the second interface 132 is completed first and the download via the first interface 131 is continued. Next, the multi-interface handler 120 re-divides the remaining content S1160 such that the remaining content 1160 after the download via the first interface 131 is distributed to and downloaded via the first interface 131 and the second interface 132. The former chunk data S1162 of the re-divided content S1160 is downloaded via the first interface 131 and the latter chunk data S1164 of the re-divided content S1160 is downloaded via the second interface 132.

FIG. 17C depicts operations of the multi-interface handler for the multi-radio access according to yet another embodiment of the present disclosure.

Referring to FIG. 17C, the multi-interface handler 120 forwards the download request Full Request for the whole content to the server 150 in operation S1102. If receiving the response of the download request from the server 150 as in operation S803 and operation S804 of FIG. 14, the multi-interface handler 120 distributes the remaining content to download to the interfaces and forwards the range request to the server 150 so as to download the corresponding content via the corresponding interface. In operation S1112, the multi-interface handler 120 receives and processes the response of the Full Request. If the remaining content is distributed to the two interfaces 131 and 132, the multi-interface handler 120 forwards the range request to the server 150 so as to download the other chunk (e.g., the latter chunk) of the remaining content via the second interface 132 being the other interface.

In operation S1112 and operation S1118, the multi-interface handler 120 receives and processes the responses of the Full Request and the range request. In operation S1112, the multi-interface handler 120 receives the former chunk of the remaining content received according to the Full Request, from the server 150 via the first interface 131. If the content is received in operation S1112 until the start of the other chunk (e.g., the latter chunk) of the remaining content requested in operation S1114, the reception is aborted. In operation S1118, the multi-interface handler 120 receives the latter chunk of the remaining content corresponding to the range request for the latter chunk of the remaining content, from the server 150 via the second interface 132.

If completing the download via either the first interface 131 or the second interface 132, the multi-interface handler 120 re-distributes the remaining content to download to the interfaces and forwards the range request to the server 150 so as to receive the corresponding content via the corresponding interface in operation S1120. If the remaining content is re-distributed to download via the two interfaces 131 and 132, the multi-interface handler 120 forwards the range request to the server 150 so as to download the other chunk (e.g., the latter chunk) of the remaining content re-distributed, via the interface which completes the download in operation S1120, in operation S1122. In FIG. 17C, the first interface 131 completes the download first and the new range request is forwarded to the server 150 via the first interface 131 in operation S1122.

The multi-interface handler 120 receives and processes the response of the range request in operation S1126. In operation S1126, the multi-interface handler 120 receives the latter chunk of the re-divided remaining content corresponding to the range request of the latter chunk of the re-divided remaining content, from the server 150 via the first interface 131.

Figure 17D:
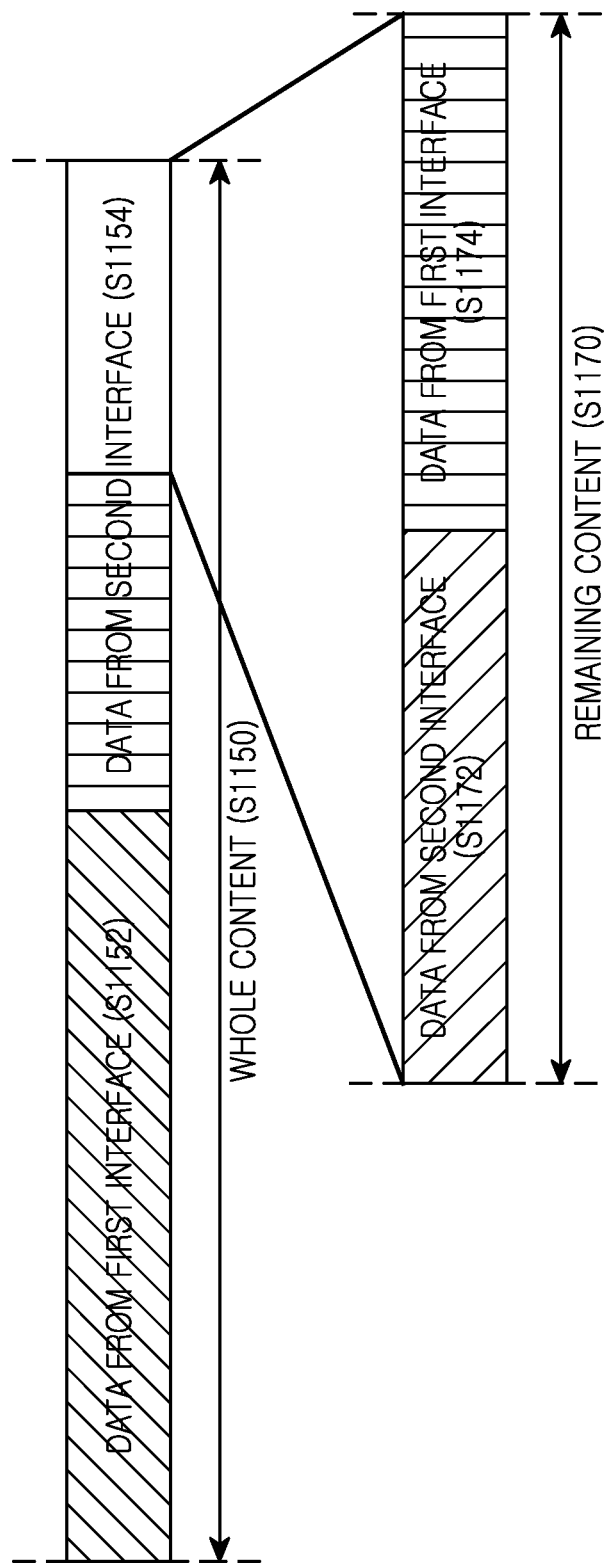

FIG. 17D depicts contents downloaded according to the multi-radio access according to yet another embodiment of the present disclosure. If the remaining content is distributed to and downloaded via the interfaces as shown in FIG. 17C, the download of the first interface 131 is finished first.

Referring to FIG. 17D, the whole content S1150 to download is distributed to the former chunk data S1152 and the latter chunk data S1154 to be downloaded via the first interface 131 and the second interface 132 respectively. In this case, the download of the former chunk data S1152 of the content S1150 via the first interface 131 is completed first and the download via the second interface 132 is continued. Next, the multi-interface handler 120 re-distributes the remaining content S1170 such that the content 1170 remaining after the download via the second interface 132 is downloaded via the first interface 131 and the second interface 132. The former chunk data S1172 of the re-divided content S1170 is downloaded via the second interface 132 and the latter chunk data S1174 of the re-divided content S1170 is downloaded via the first interface 131.

Figure 18A:
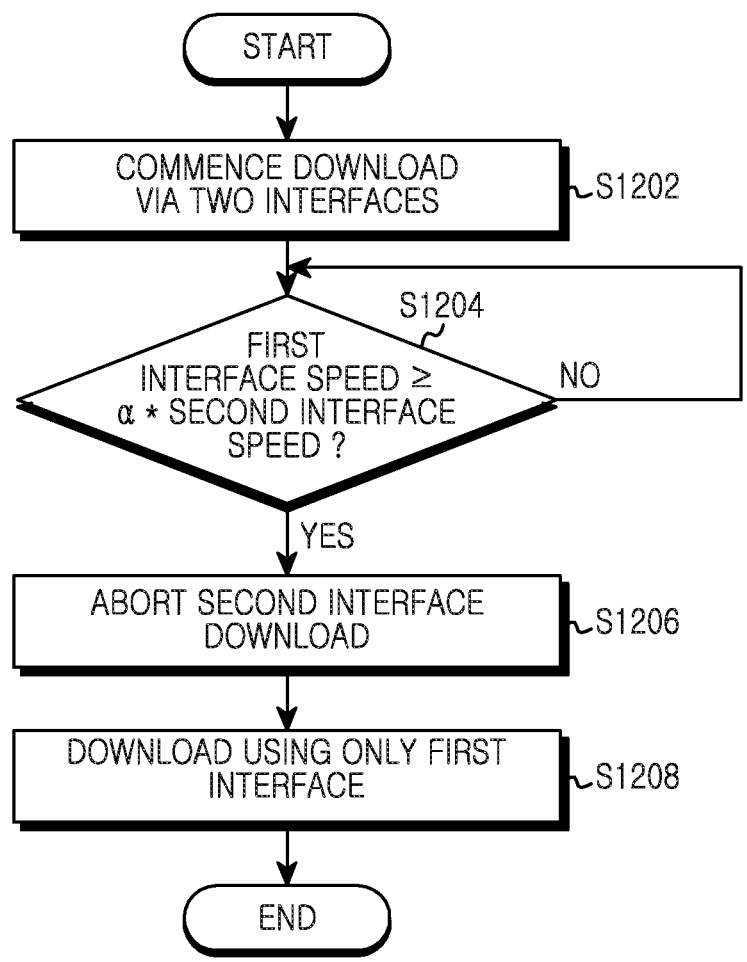
FIG. 18A illustrates interface switch in a multi-radio access according to an embodiment of the present disclosure.

FIG. 18A illustrates the interface switch in the multi-radio access according to another embodiment of the present disclosure. The interface switch can be performed by, for example, the multi-interface handler 120 of FIG. 14, 15, 16A, or 17A.

Referring to FIG. 18A, in operation S1202, the multi-interface handler 120 downloads the content via the two interfaces including the first interface 131 being the default interface and the second interface 132 being the other interface. In operation S1204, the multi-interface handler 120 determines whether the speed difference of the two interfaces exceeds a certain ratio during the download. That is, the multi-interface handler 120 determines whether the download speed of the first interface 131 is α times (α is a real number) greater than the download speed of the second interface 132. This determination can be performed by the interface balancer 126 of the multi-interface handler 120. If the download speed of the first interface 131 is α times greater than the download speed of the second interface 132, the multi-interface handler 120 aborts the download via the second interface 132 in operation S1206 and switches the download only to the first interface 131 of the higher speed in operation S1208. For example, if the download speed of the first interface 131 is four or five times greater than the download speed of the second interface 132, the multi-interface handler 120 uses only the first interface 131 in order to prevent the speed loss.

Figure 18B:
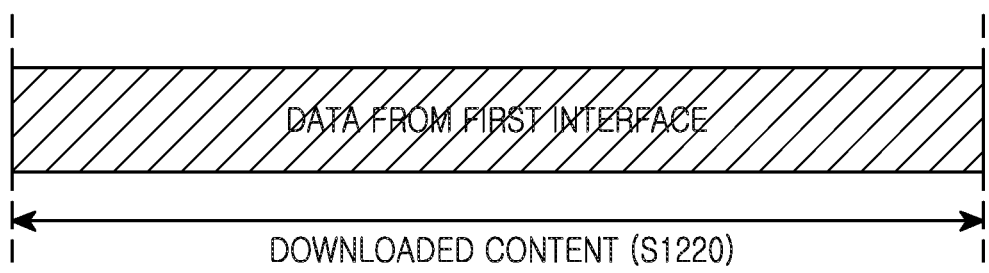
FIG. 18B illustrates contents downloaded according to an interface switch in a multi-radio access according to an embodiment of the present disclosure.

FIG. 18B depicts the content download according to the interface switch in the multi-radio access according to yet another embodiment of the present disclosure. The content is downloaded according to the method of FIG. 18A.

Referring to FIG. 18B, the download speed of the first interface 131 is greater than the download speed of the second interface 132 and the speed ratio exceeds a certain ratio, the single interface switch is applied to the first interface 131. While the content S1220 is divided and downloaded into two chunks, the data received via the second interface until the speed ratio is checked is ignored and the first interface 131 receives the data to the end.

Figure 19A:
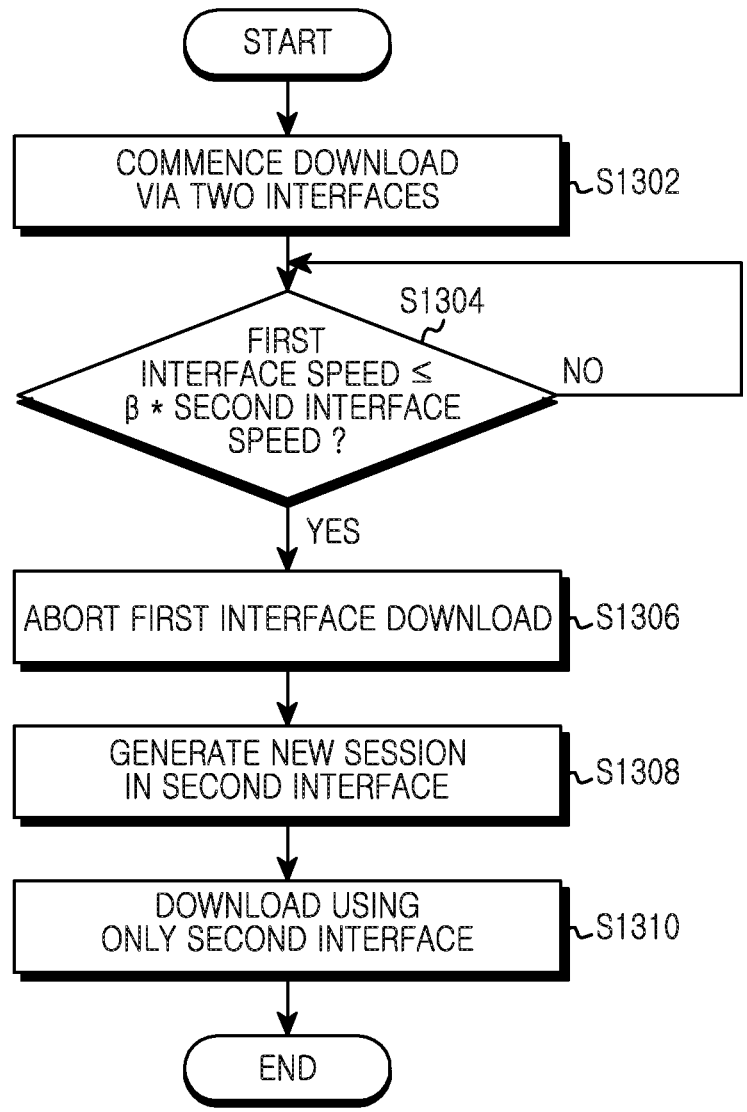
FIG. 19A illustrates an interface switch in a multi-radio access according to another embodiment of the present disclosure.

FIG. 19A is a flowchart of the interface switch in the multi-radio access according to another embodiment of the present disclosure. The interface switch can be performed by, for example, the multi-interface handler 120 of FIG. 14, 15, 16A, or 17A.

Referring to FIG. 19A, in operation S1302, the multi-interface handler 120 downloads the content via the two interfaces including the first interface 131 being the default interface and the second interface 132 being the other interface. In operation S1304, the multi-interface handler 120 determines whether the speed difference of the two interfaces exceeds the certain ratio during the download. That is, the multi-interface handler 120 determines whether the download speed of the first interface 131 is β times (β is a real number) smaller than the download speed of the second interface 132. This determination can be performed by the interface balancer 126 of the multi-interface handler 120. If the download speed of the first interface 131 is β times smaller than the download speed of the second interface 132, the multi-interface handler 120 aborts the download via the first interface 131 in operation S1306. The multi-interface handler 120 generates a new session to the second interface 132 in operation S1308 and downloads the content only via the second interface 132 of the higher speed in operation S1310. For example, if the download speed of the first interface 131 is ¼ or ⅕ times smaller than the download speed of the second interface 132, the multi-interface handler 120 uses only the second interface 132 in order to prevent the speed loss.

Figure 19B:
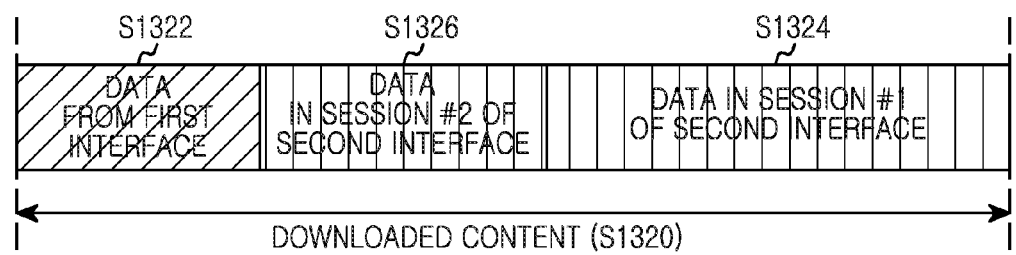
FIG. 19B illustrates contents downloaded according to an interface switch in a multi-radio access according to another embodiment of the present disclosure.

FIG. 19B depicts the content downloaded according to the interface switch in the multi-radio access according to yet another embodiment of the present disclosure. The content is downloaded according to the method of FIG. 19A.

Referring to FIG. 19B, if the download speed of the first interface 131 is smaller than the download speed of the second interface 132 and the speed ratio exceeds a certain ratio, the single interface switch is applied to the second interface 132. The content S1320 is divided and downloaded into two chunks, and the download via the first interface 131 aborts from the point of the speed ratio check in S1322. The download session #1 of the second interface 132 continues and finishes the download in S1324. A new session #2 is generated in the second interface 132 to concurrently download the chunk received via the first interface 131 in S1326.

Figure 20A:
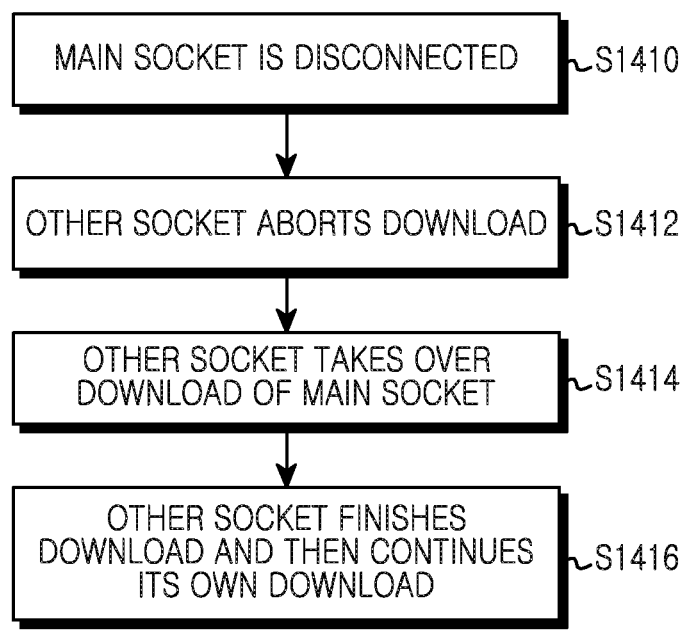
FIG. 20A illustrates a content download if a socket is lost in a multi-radio access according to an embodiment of the present disclosure.
Figure 20B:
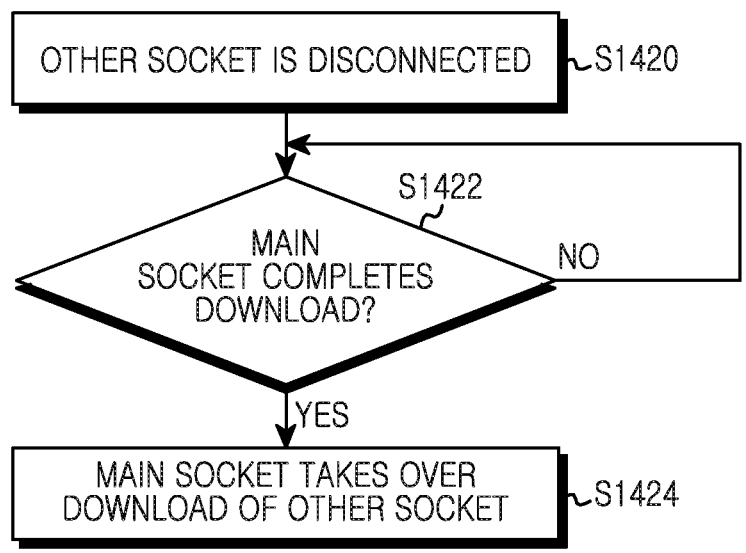
FIG. 20B illustrates a content download if the socket is lost in a multi-radio access according to another embodiment of the present disclosure.

FIG. 20A is a flowchart of the content download if the interface is disconnected in the multi-radio access according to an embodiment of the present disclosure. FIG. 20B is a flowchart of the content download if the interface is disconnected in the multi-radio access according to an embodiment of the present disclosure. The methods can be performed by, for example, the multi-interface handler 120 of FIG. 14, 15, 16A, or 17A.

If the socket connection of each interface is lost as the interfaces are disconnected, for example, outside the communication area (e.g., a Wi-Fi zone) in the multi-radio access operation, the session is handed over to the other interface and the download of the remaining content chunk is continued. The socket for the application 110 to directly read the data can be referred to as a main socket, and the socket for storing the data in the storage (e.g., the buffer) can be referred to as the other socket.

Referring to FIG. 20A, the multi-interface handler 120 determines the disconnection of the main socket in operation S1410. In operation S1412, the multi-interface handler 120 aborts the download of the other socket. In operation S1414, the multi-interface handler 120 controls the other socket to take over the download of the main socket. In operation S1416, the multi-interface handler 120 controls the other socket to finish the download and then continues its own download. The main socket downloads the former chunk of the data. If the corresponding socket is lost, the user may feel that the download is halted. Accordingly, if the main socket is lost, the other socket stops its download and takes over the front chunk being received by the main socket.

Referring now to FIG. 20B, the multi-interface handler 120 determines that the other socket is disconnected in operation S1420. In operation S1422, the multi-interface handler 120 determines whether the main socket finishes the download. If the main socket finishes the download, the multi-interface handler 120 controls to the main socket to take over the chunk downloaded by the other socket in S1424. Since the other socket, which downloads the latter chunk of the data, stores the data in the storage, the user does not feel the download halt though the connection is lost. Thus, the main socket finishes its download and takes over the data downloaded by the other socket.

Figure 21:
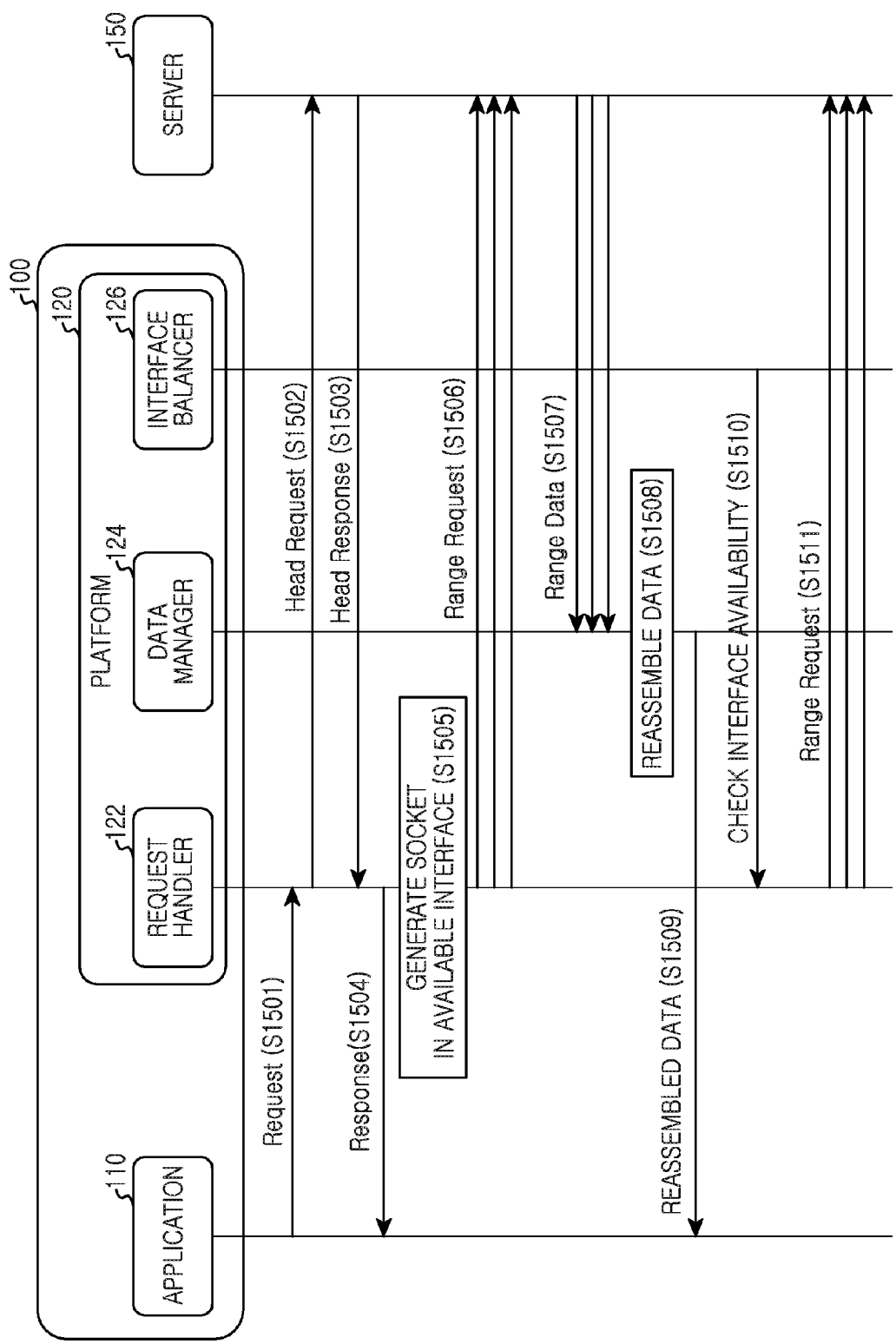
FIG. 21 illustrates a method for processing a multi-radio access in an electronic device according to still another embodiment of the present disclosure.

FIG. 21 illustrates a method for processing the multi-radio access in the electronic device according to still another embodiment of the present disclosure.

Referring to FIG. 21, in operation S1501, the application 110 in electronic device 100 sends the request (e.g., the HTTP GET request) for downloading the content from the server 150.

In operation S1502, the request handler 122 of the platform 120 intercepts the request and sends the HEAD request for obtaining only the content information, rather than the content body. For example, in the HTTP, the request handler 122 sends the HTTP HEAD request. The HEAD request is sent to the server 150.

In operation S1503, the request handler 122 receives the HEAD response from the server 150. For example, in the HTTP, the request handler 122 receives the HTTP HEAD response.

In operation S1504, the request handler 122 may send the response to the application 110 in reply to the received HEAD response. The response is sent to the application 110 if the appropriate HEAD response is not received, for example, if the requested content is not confirmed or the connection is unavailable. In this case, the process is finished.

In operation S1505, if receiving the appropriate HEAD response, the request handler 122 identifies all the available data interfaces, generates the socket for each data interface, and connects the generated socket to the target server 150 which provides the requested data. For example, the mobile device generates the socket for the Wi-Fi interface to access the server 150 over the Wi-Fi wireless LAN, and the socket for the cellular data interface to access the server 150 over the 3G/LTE network.

In operation S1506, based on the downloading algorithms to be explained, the request handler 122 sends the range request in each socket to get the different chunks of the content. For example, in the HTTP, the request handler 122 sends the HTTP range requests including the scope or range field of the request header, to the server 150. The scope and the size of each chunk are determined by the downloading algorithm to be explained.

If receiving the range data in response to the range request in operation S1507, the data manager 124 reads and stores the response data in the buffer.

Since the data is received simultaneously from the different sockets, the data may not be received in the adequate order. In operation S1508, the data manager 124 reassembles the data in the same sequence as the original sequence of the requested content. In operation S1509, the data manager 124 returns the reassembled data to the application 110.

In operation S1510, the interface balancer 126 checks the availability of the interfaces and notifies the result to the request handler 122.

In operation S1511, according to the availability of the interfaces, the request handler 122 sends the other range requests to the server 150 for the next download.

Figure 22:
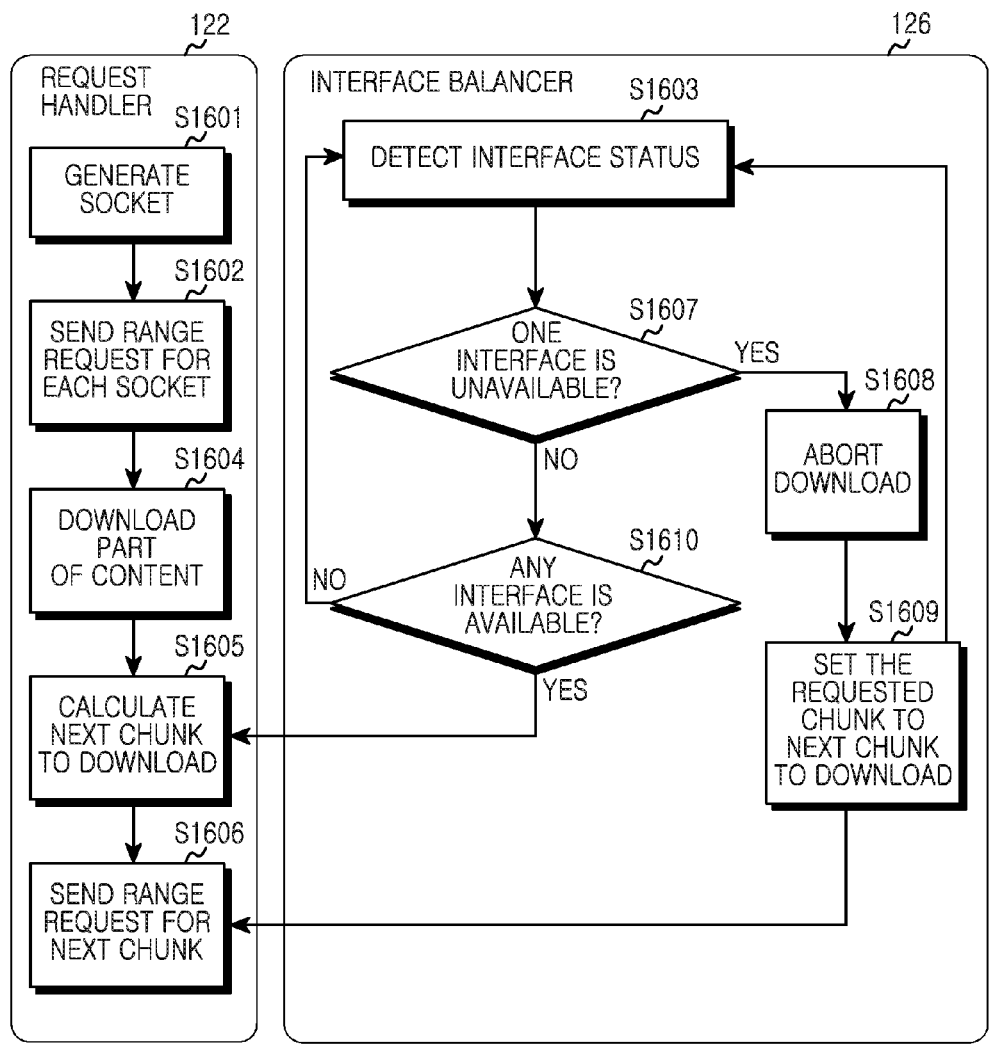
FIG. 22 illustrates a method for processing a multi-range request in an electronic device according to still another embodiment of the present disclosure.

FIG. 22 illustrates a method for processing the multi-range request in the electronic device according to still another embodiment of the present disclosure.

Referring to FIG. 22, in operation S1601, the request handler 122 generates the sockets for the data interfaces. After the sockets are generated and connected, the request handler 122 sends the range request of each socket in operation S1602. The range request for the sockets can include the scope for downloading the fixed-size chunk.

If the certain chunk is completely downloaded in operation S1604, the request handler 122 calculates the next chunk to download in operation S1605 and sends the range request for the next chunk in operation S1605. The next chunk to download is calculated if any interface is available in operation S1610. The next chunk to download is calculated based on Equation 5.

$$\text{Range Request } N\text{=From byte } [PL^*(N-1)] TO \text{ byte} \\ [\text{MIN}(L-1, PL^*N-1)] \quad \text{Equation 5}$$

N denotes an index of the chunk to download, PL denotes the size of the fixed chunk, and L denotes a length of the whole content to download.

In operation S1603 and operations S1607 through S1610, the interface balancer 126 detects the interface availability of the data interface sockets.

If one interface is not available in operation S1607, the interface balancer 126 aborts the download of the unavailable interface in operation S1608 and sets the remaining content to download via the unavailable interface, to the next chunk to download in operation S1609. Hence, every time the other available interface completes the download of the chunk requested to itself, it also downloads the remaining content which is to be downloaded originally by the unavailable interface.

If a new interface is available in operation S1610, the interface balancer 126 calculates the next chunk to download based on Equation 5 in operation S1605 and sends the range request for the calculated next chunk in operation S1606 to thus download the next chunk via the available interface.

The interface availability can be determined based on the download speed affecting the data throughput, the signal strength, and other parameters. For example, if the download speed of the interface is smaller than the threshold, the interface may be considered as being unavailable. If the RSSI of the radio interface is smaller than the threshold, the interface may be considered as being unavailable.

Figure 23:
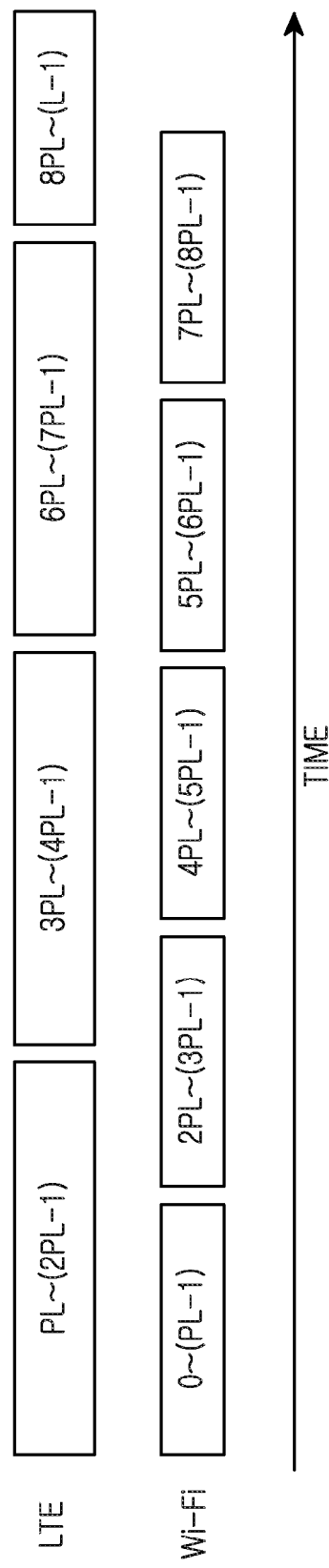
FIG. 23 illustrates a multi-range request in an electronic device according to an embodiment of the present disclosure.

FIG. 23 depicts the multi-range request in the electronic device according to an embodiment of the present disclosure. Two interfaces download the content according to the algorithm of FIG. 23. For example, if the cellular (LTE) interface and the Wi-Fi interface are available, the fixed-sized chunks are downloaded via the cellular (LTE) interface and the Wi-Fi interface according to the algorithm of FIG. 23. [0~(PL−1)] of the content is downloaded via the Wi-Fi interface, [PL~(2PL−1)] of the content is downloaded via the LTE interface, [2PL~(3PL−1)] of the content is downloaded via the Wi-Fi interface, [3PL~(4PL−1)] of the content is downloaded via the LTE interface, [4PL~(5PL−1)] of the content is downloaded via the Wi-Fi interface, [5PL~(6PL−1)] of the content is downloaded via the Wi-Fi interface, [6PL~(7PL−1)] of the content is downloaded via the LTE interface, [7PL~(8PL−1)] of the content is downloaded via the Wi-Fi interface, and [8PL~(L−1)] of the content is downloaded via the LTE interface. The content chunks downloaded via the LTE interface and the Wi-Fi interface have the fixed-sized PL, whereas their download time differs according to the download speed of the interface.

Figure 24:
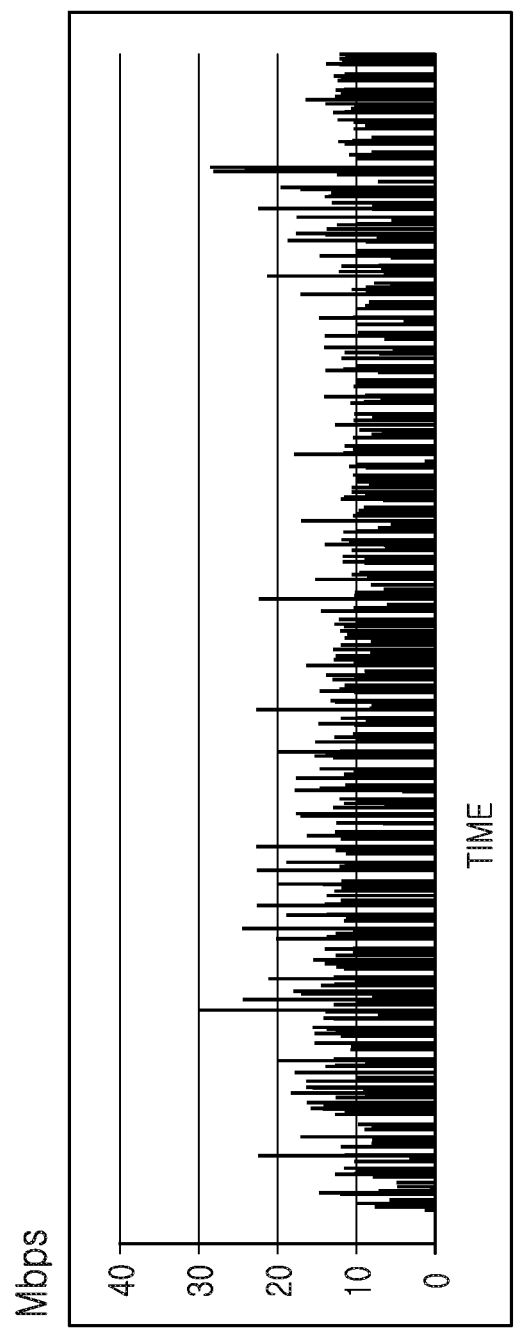
FIG. 24 illustrates a throughput based on a multi-range request in an electronic device according to an embodiment of the present disclosure.

FIG. 24 depicts the throughput based on the multi-range request in the electronic device according to an embodiment of the present disclosure. If the content is downloaded according to the algorithm of FIG. 22, the download speed in the short download interval is alike and does not change greatly. This indicates that the algorithm of FIG. 22 provides the stable throughput in the content download.

As such, the application is executed in the electronic device, the corresponding content can be downloaded concurrently via the multiple data interfaces, thus achieving the high-speed download. For example, the mobile device can rapidly download the content from the server by activating both of the Wi-Fi interface and the LTE data interface. According to the present disclosure, the download speed can attain the sum of the Wi-Fi speed and the LTE speed. Alternatively, while the download speed can reach 85% of the sum of the Wi-Fi speed and the LTE speed, the stable throughput can be guaranteed.

To achieve the high network throughput, the mobile devices can activate all the available data interfaces and thus the applications can generate the connections via the available data interfaces. However, such a process may not be applied to every occasion. In the first case, the application requests a small-sized file. For example, if the user browses a webpage, each HTTP request can get the content of only 10-100 KB. In this case, the time overhead for generating the socket in each available interface degrades the speed. In the second case, the application reads the low-speed socket data, for example, the user views a low-bitrate video. In this case, the speed of one data interface may satisfy the application. The other activated interfaces are not beneficial to the user and consumes more power, and the data usage over the cellular network incurs more costs. As such, if the multiple interfaces are applied to every case, it is a waste of energy and money. Thus, it is necessary to provide a mechanism for activating the multi-interface transmission only if it is required in the electronic device.

Alternatively, the electronic device may smartly determine whether to use the multiple interfaces. Hence, the mobile device can reduce the power consumption and the data usage over the cellular network if the multiple interfaces are not used, and can achieve the rapid transmission if the multiple interfaces are used.

Figure 25:
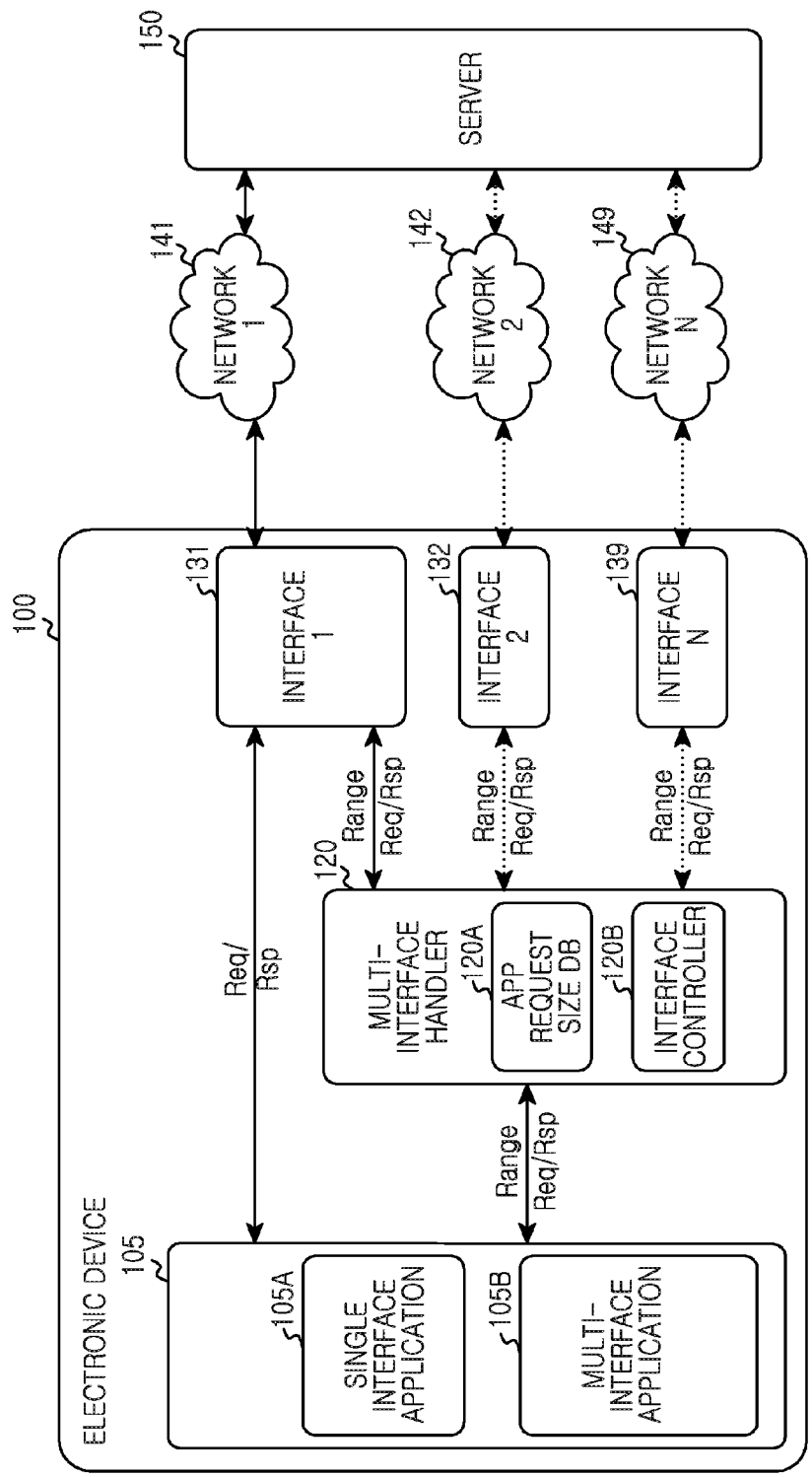
FIG. 25 illustrates an electronic device for a multiple radio accesses according to yet another embodiment of the present disclosure.

FIG. 25 is a block diagram of the electronic device for the multiple radio accesses according to yet another embodiment of the present disclosure. The electronic device 100 includes an application manager 105, the multiple interface handler 120, and the plurality of the interfaces 131 through 139.

The application manager 105 divides and manages the applications installed in the electronic device 100 in a single interface application group 105A and a multi-interface application group 105B. If or after the application is installed, the application can be set to one of the groups. For example, a chatting tool such as Google Talk, which does not need to receive a large-sized content, can be set to the single interface application group 105A.

If the application of the single interface application group 105A is executed and the content is requested, the application manager 105 sends the request to the single interface 131. The request is sent to the server 150 via the single interface 131 and the corresponding network 141, and the server 150 provides the corresponding content to the corresponding application of the single interface application group 105A via the network 141 and the interface 131. The single interface 131 is the default interface available if the application of the single interface application group 105A requests to visit the Internet (the server 150).

If the application of the multi-interface application group 105B is executed and requests the content, the application manager 105 sends the request to the multi-interface handler 120. In response to the request, the multi-interface handler 120 generates the multiple requests. The multiple requests are sent to the server 150 via the corresponding interfaces 131 through 139 and the corresponding networks 141 through 149. In response, the server 150 provides the corresponding content to the corresponding application of the multi-interface application group 105B via the networks 141 through 149 and the interfaces 131 through 139.

As such, if the application of the multi-interface application group 105B requests to visit the Internet, the request is sent to the multi-interface handler 120 via a framework of the mobile device.

The multi-interface handler 120 includes an app request size database (DB) 120A and an interface controller 120B. The app request size DB 120A is a self-learning database for recording history of the size of the content requested by the application. The DB 120A aids in determining whether to use the multiple interfaces if the application transmits and receives the data over the Internet.

If the network visiting request is received at the multi-interface handler 120, the interface controller 120B determines whether to use the multiple interfaces based on the history of the app request size DB 120A. As the application receives the data, the interface controller 120B determines whether to use the multiple interfaces based on the comparison of the interface socket speed and the application reception speed.

As above, the multi-interface handler 120 determines whether to use the multi-interface transmission. If the application requesting the data is set to the multi-interface application group 105B, the multi-interface handler 120 intercepts the Internet visiting request from the application. In this case, the multi-interface application can be used. If the history of the requested content size recorded in the app request size DB 120A is considerable, the multi-interface transmission is commenced. Otherwise, the single-interface transmission is commenced. During the transmission, the interface controller 120B dynamically balances the interfaces.

Figure 26:
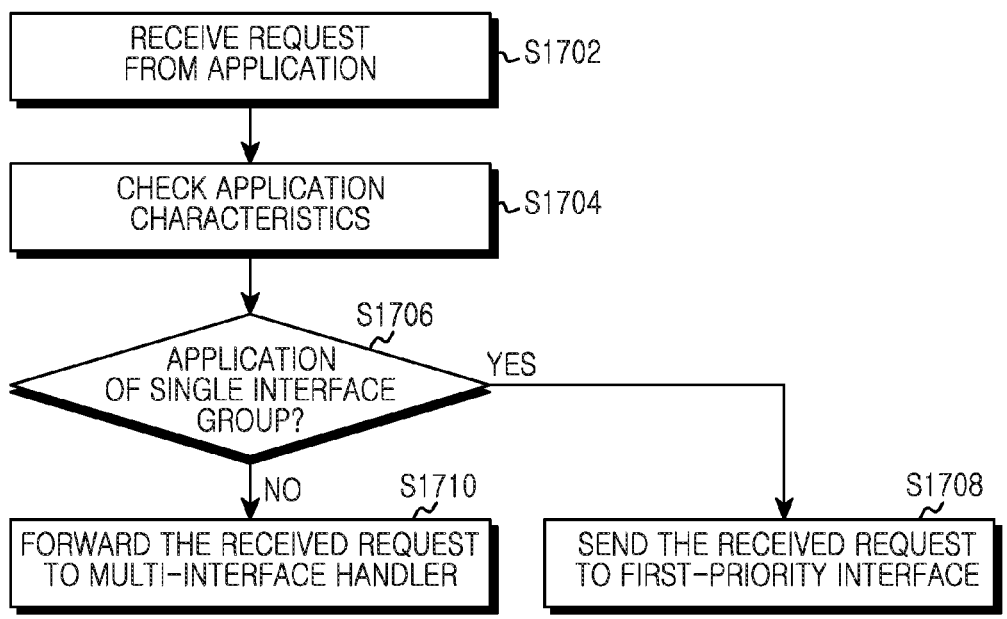
FIG. 26 illustrates a method for determining whether a multi-radio access is set according to an embodiment of the present disclosure.

FIG. 26 is a flowchart of a method for determining whether the multi-radio access is set according to an embodiment of the present disclosure. If the set application group is confirmed, the method determines whether to use the multi-interface transmission based on the confirmation. The application group can be set by an application user, an application provider, or the framework of the mobile device if or after the application is installed. The application user can set the applications on a user screen as shown in FIGS. 27A and 27B.

Figure 27A:
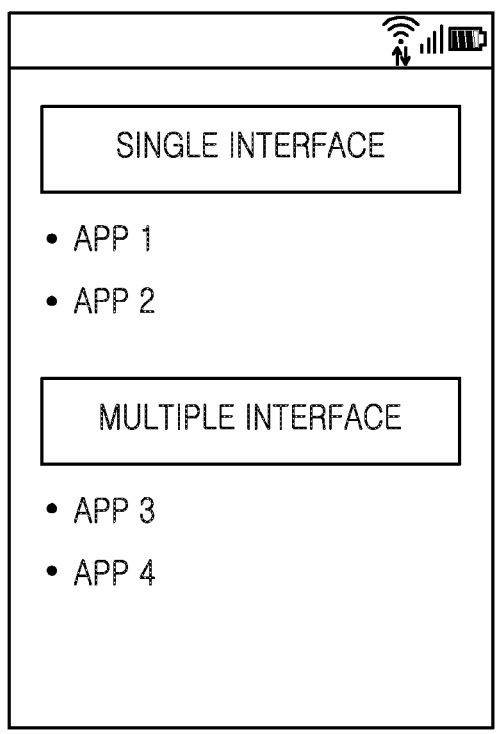
FIGS. 27A and 27B illustrate application group setting for a multi-radio access according to an embodiment of the present disclosure.
Figure 27B:
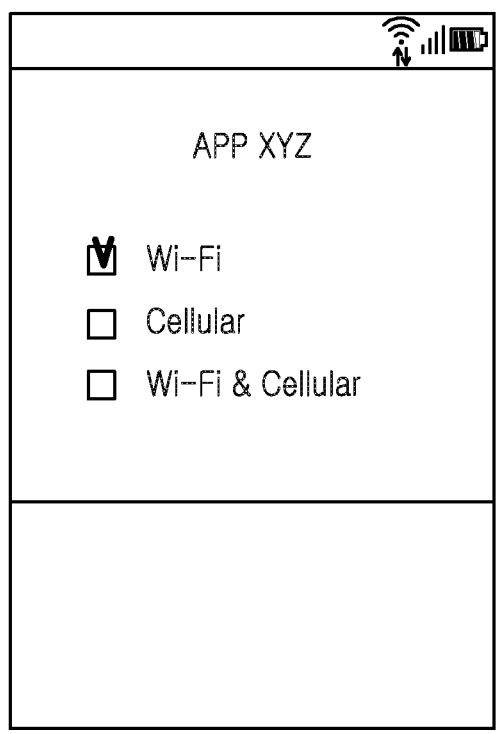

FIGS. 27A and 27B illustrate application group setting for the multi-radio access according to an embodiment of the present disclosure.

For example, the applications can be set to the single interface application group or the multi-interface application group in an interface application group setting as shown in FIG. 27A. The App1 and the App2 can be set to the single interface application group, and the App3 and the App4 can be set to the multi-interface application group. For example, the interface of the application can be set in the application setting as shown in FIG. 27B. For the App XYZ, the Wi-Fi interface or the cellular interface can be set to the single interface. In contrast, for the App XYZ, both of the Wi-Fi interface and the cellular interface can be set to the multiple interfaces. While the single interface or the multi-interface of the application is set on the user screen, the interface may be set using a voice message.

Referring back to FIG. 26, if receiving the Internet visiting request from a particular application in operation S1702, the application manager 105 checks the characteristics of the application in operation S1704. If the application relates to the single interface group in operation S1706, the application manager 105 uses the interface of the first priority in operation S1708. That is, the application manager 105 sends the received request to the first-priority interface. The first-priority interface can be used fixedly by the mobile device. For example, since there is no fee for the Wi-Fi transmission, the Wi-Fi interface can be used as the interface of the first priority.

In contrast, if the application relates to the multi-interface group in S1706, the application manager 105 forwards the received request to the multi-interface handler 120 in operation S1710.

FIG. 28 depicts the app request size DB for the multiple radio accesses, for example, the app request size DB 120A of FIG. 25 according to an embodiment of the present disclosure. The app request size DB 120A includes a table relating to the applications. The table records the number of the requested content sizes based on a size scope and a time period. For example, if the time period is the day, the table records whether the size of the content requested daily is in the scope of [0~S1] or [S1~S2]. If the time-period record gets old, it can be erased from the table. As such, the scope and the frequency of the requests can be obtained from the recorded information.

Figure 29:
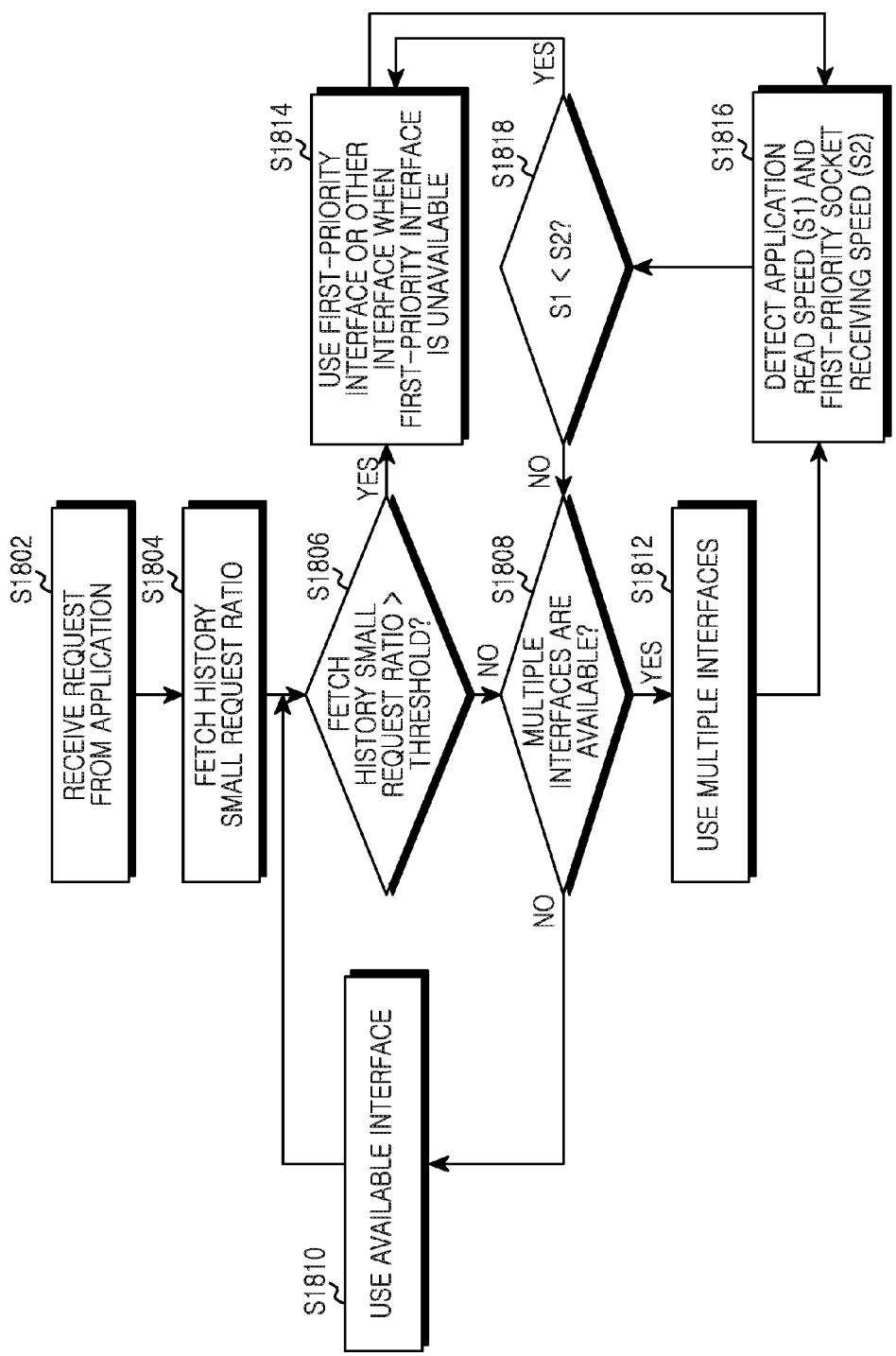
FIG. 29 illustrates a method for determining whether to use a multi-radio access according to an embodiment of the present disclosure.

FIG. 29 is a flowchart of a method for determining whether to use the multi-radio access according to an embodiment of the present disclosure. The interface handler 120 of FIG. 25 determines whether to use the multiple interfaces in order to obtain the requested content.

Referring to FIG. 29, if receiving the request from the application in operation S1802, the interface controller 120B fetches a history small request ratio from the app request size DB 120B in operation S1804. The history small request ratio is a percentage of the history of the requests for the content smaller than the threshold, which can be calculated based on Equation 6.

$$\sum_{[0\sim S1]}^{[Si\sim Sj)}_{Si<Threshold} \sum_{TimePeriod1}^{T} \Bigg/ \sum_{[0\sim S1]}^{[Sn\sim\infty)} *100\% \quad \text{Equation 6}$$

The size threshold is a dynamic value which can be defined by the interface controller 120B and depends on the network speed of the mobile device. For example, the threshold can be the bytes downloaded within hundreds of milliseconds via the Wi-Fi interface of the mobile device.

If the history small request ratio is greater than the threshold in operation S1806, the interface controller 120B determines to use the single interface in operation S1814. The interface of the first priority can be used. If the interface of the first priority is unavailable, the other interface can be used. For example, if 90% of the requested content history is smaller than 100 KB, this implies that the current request content can be a small-sized content. In this case, the transmission commences via the single interface.

If the history small request ratio is not greater than the threshold in operation S1806, the interface controller 120B determines whether to use the multiple interfaces in operation S1808. If only one interface is available in operation S1808, the interface controller 120B uses the available interface alone in operation S1810 and periodically determines whether the other interface is available.

If the multiple interfaces are available in operation S1808, the interface controller 120B uses the multiple interfaces in operation S1812. That is, the multiple interfaces are activated to commence the transmission.

Even if the multiple interfaces are available, the use of a particular interface may incur a charge. Hence, the user may be inquired about whether to use the multiple interfaces. For example, the user screen can be used for the inquiry as shown in FIG. 30.

Figure 30:
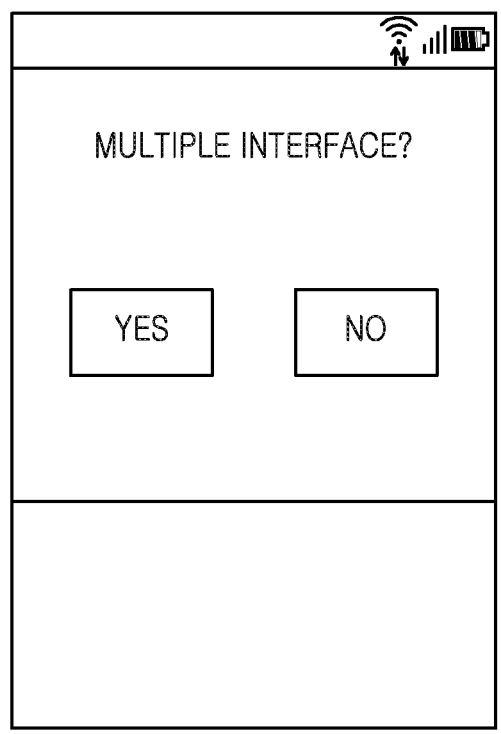
FIG. 30 illustrates a screen inquiring a user about whether to use a multiple interfaces in a multi-radio access according to an embodiment of the present disclosure.

FIG. 30 illustrates a screen inquiring a user about whether to use a multiple interfaces in a multi-radio access according to an embodiment of the present disclosure.

For another example, the voice message may be used to inquire about whether to use the multiple interfaces.

In the process of the multi-interface transmission, the interface controller 120B periodically checks an application read speed S1 and a socket receiving speed S2 of the first-priority interface in operations S1816 and S1818. The application read speed S1 is the speed for the application to read the data from the data buffer (not shown) of the multi-interface handler 120. The socket receiving speed S2 of the first-priority interface is the speed for receiving the data from the first-priority interface.

If the Si is smaller than the S2 in operation S1818, this implies that the application slowly reads the data from the buffer and the first-priority interface satisfies the application. In this case, the interface handler 120 deactivates the multi-interface transmission and downloads the content using only the first-priority interface in operation S1814.

If the S1 is not smaller than the S2 in operation S1818, this implies that the application rapidly reads the data from the buffer and the first-priority interface cannot satisfy the application. In this case, the interface handler 120 activates the multi-interface transmission.

Alternatively, the multi-interface transmission is activated only if it is necessary. If the Wi-Fi speed satisfies the application in the mobile device, it is sufficient to download the data using only the Wi-Fi interface. If the requested content is quite small and the Wi-Fi interface is available, the data can be downloaded using only the Wi-Fi interface. In contrast, if the Wi-Fi speed does not satisfy the application, the cellular data interface can be activated and the data can be rapidly downloaded via both of the Wi-Fi interface and the cellular data interface.

As set forth above, the present disclosure can receive the multimedia service over the multiple radio access networks at the same time. The multimedia service data can be received rapidly via the plurality of the data interfaces. In addition, the multimedia service data can be stably received via the plurality of the data interfaces. Further, the multimedia service data can be adaptively received via the multiple data interfaces or the single data interface.

Program instructions for carrying out various operations executed by a computer can be recorded in a non-transitory computer-readable medium. The non-transitory computer-readable medium can include, alone or in combination, the program instructions, data files, data structures, and the like. The program instructions may be designed and constructed especially for the implementations of the present disclosure, or well known to those skilled in the art. Examples of the non-transitory computer-readable storage medium include magnetic media, such as hard disks, floppy disks, and magnetic tape, optical media such as Compact Disc (CD)-Read Only Memory (ROM) disks and Digital Versatile Discs (DVDs), magneto-optical media, such as floptical disks, and hardware devices specially configured to store and execute the program instructions, such as ROM, Random Access Memory (RAM), flash memory, and the like. Examples of program instructions include machine code produced by a compiler, and high-level language code executed by the computer using an interpreter. If all or part of the electronic device, network, or server is implemented as a computer program, the present disclosure can also include the non-transitory computer-readable recording medium storing the computer program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a storage configured to store instructions therein;
a plurality of network interfaces configured to access a multimedia service provider; and
at least one processor,
wherein, upon execution of the instructions, the at least one processor is configured to:
control to receive, via the plurality of network interfaces, contents including a plurality of parts from the service provider, and
if one part of the contents is completely received via one of the network interfaces, receive remaining contents of another part of the contents via the network interfaces respectively, and
wherein the remaining contents of the another part of the contents are re-divided based on a throughput of each of the plurality of network interfaces.

2. The electronic device of claim 1, wherein the at least one processor is further configured to:
request the contents from the service provider by distributing a request for the contents to the plurality of network interfaces, and
if the one part of the contents is completely received via one of the plurality of network interfaces, request the remaining contents of the another part of the contents from the service provider by re-distributing the request for the remaining contents of the another part of the contents to the plurality of network interfaces.

3. The electronic device of claim 1, wherein the at least one processor is further configured to:
reassemble the one part of the contents and the another part of the contents received via the plurality of network interfaces, and
forward the reassembled contents to a corresponding application.

4. The electronic device of claim 1, wherein the plurality of network interfaces comprises:
a default interface that is activated, and
another interface that is selectively activated.

5. The electronic device of claim 4, wherein the at least one processor is further configured to check a speed of each of the plurality of network interfaces.

6. The electronic device of claim 5, wherein, the at least one processor is further configured to, if a speed difference between the default interface and the other interface exceeds a preset ratio, control to receive the contents only via an interface of a higher speed.

7. The electronic device of claim 6, wherein, the at least one processor is further configured to, if a speed of the default interface is greater than a speed of the other interface by the ratio, control to:
ignore a previous contents received via the other interface, and
receive the remaining contents excluding a content previously received via the default interface, via the default interface.

8. The electronic device of claim 6, wherein, the at least one processor is further configured to, if the speed of the other interface is greater than the speed of the default interface by the ratio, control to receive the remaining contents, excluding a content previously received in the default interface and in a first session of the other interface, in a second session of the other interface.

9. The electronic device of claim 4, wherein the at least one processor is further configured to determine whether each of the plurality of network interfaces is disconnected.

10. The electronic device of claim 9,
wherein, the at least one processor is further configured to, if the default interface is disconnected, abort the content reception via the other interface, and
wherein the other interface takes over the content download of the default interface and, after completing the download, takes over its own content download.

11. The electronic device of claim 9, wherein, the at least one processor is further configured to, if the other interface is disconnected, complete the content download of the default interface and then the default interface takes over the content download of the other interface.

12. The electronic device of claim 4, wherein, if a multi-radio access function is set, the other interface is activated together with the default interface and the set multi-radio access function is displayed visually.

13. The electronic device of claim 12, wherein the other interface is activated in response to the set multi-radio access function or in response to the received content request.

14. The electronic device of claim 4, wherein the plurality of network interfaces comprises:
a wireless fidelity (Wi-Fi) interface as the default interface, and
a long term evolution (LTE) interface as the other interface.

15. The electronic device of claim 4, wherein the at least one processor is further configured to control to receive:
a first chunk of the contents via the default interface,
a second chunk of the contents following the first chunk via the other interface,
a third chunk of the remaining contents via the default interface, and
a fourth chunk of the remaining contents following the third chunk via the other interface.

16. The electronic device of claim 15, wherein the first chunk is equal to the second chunk in size, and the third chunk is equal to the fourth chunk in size.

17. A method for operating an electronic device, the method comprising:
receiving, via a plurality of network interfaces, contents including a plurality of parts from a service provider; and
if one part of the contents is completely received via one of the plurality of network interfaces, receiving the remaining contents of another part of the contents via the plurality of network interfaces,
wherein the remaining contents of the another part of the contents are re-divided based on a throughput of each of the plurality of network interfaces.

18. The method of claim 17, further comprising:
requesting the contents from the service provider by distributing a request for the contents to the plurality of network interfaces; and
if the one part of the contents is completely received via one of the network interfaces, requesting the remaining contents of the another part of the contents from the service provider by re-distributing the request for the remaining contents of the another part of the contents to the plurality of network interfaces.

19. The method of claim 17, further comprising:
reassembling the one part of the contents and the another part of the contents received via the plurality of network interfaces and forwarding the reassembled contents to a corresponding application.

20. The method of claim 17, wherein the plurality of network interfaces comprises:
a default interface that is activated, and
another other interface that is selectively activated.

21. The method of claim 20, further comprising:
determining whether each of the plurality of network interfaces is disconnected.

22. The method of claim 21, further comprising:
if the default interface is disconnected, aborting the content reception via the other interface; and
taking over, at the other interface, the content download of the default interface and, after completing the download, taking over its own content download.

23. The method of claim 21, further comprising:
if the other interface is disconnected, completing the content download of the default interface and then taking over, at the default interface, the content download of the other interface.

24. The method of claim 20, further comprising:
if a multi-radio access function is set, activating the other interface together with the default interface; and
visually displaying the set multi-radio access function.

25. The method of claim 24, wherein the activating comprises:
activating the other interface in response to the set multi-radio access function or in response to the received content request.

26. The method of claim 20, wherein the plurality of network interfaces comprises:
a wireless fidelity (Wi-Fi) interface as the default interface, and
a long term evolution (LTE) interface as the other interface.

27. The method of claim 20, wherein the receiving of the contents comprises:
receiving a first chunk of the contents via the default interface and a second chunk of the contents following the first chunk via the other interface; and
receiving a third chunk of the remaining contents via the default interface and a fourth chunk of the remaining contents following the third chunk via the other interface.

28. The method of claim 27, wherein the first chunk is equal to the second chunk in size, and the third chunk is equal to the fourth chunk in size.

29. The method of claim 20, further comprising:
checking a speed of at least one of the plurality of network interfaces.

30. The method of claim 29, further comprising:
if a speed difference between the default interface and the other interface exceeds a preset ratio, receiving the contents only via the interface of a higher speed.

31. The method of claim 30, further comprising:
if the speed of the default interface is greater than the speed of the other interface by the ratio, ignoring a previous contents received via the other interface and to receive the remaining contents excluding a content previously received via the default interface, via the default interface.

32. The method of claim 30, further comprising:
if the speed of the other interface is greater than the speed of the default interface by the ratio, receiving the remaining contents excluding a content previously received in the default interface and a first session of the other interface, in a second session of the other interface.

* * * * *